(12) United States Patent
Xiong et al.

(10) Patent No.: US 10,405,331 B2
(45) Date of Patent: Sep. 3, 2019

(54) SYSTEMS, METHODS AND DEVICES FOR RADIO ACCESS TECHNOLOGY COORDINATION

(71) Applicant: INTEL IP CORPORATION, Santa Clara, CA (US)

(72) Inventors: Gang Xiong, Beaverton, OR (US); Jong-Kae Fwu, Sunnyvale, CA (US); Hong He, Beijing (CN)

(73) Assignee: INTEL IP CORPORATION, Santa Clara, CA (US)

( * ) Notice: Subject to any disclaimer, the term of this patent is extended or adjusted under 35 U.S.C. 154(b) by 27 days.

(21) Appl. No.: 15/542,032

(22) PCT Filed: Sep. 21, 2015

(86) PCT No.: PCT/US2015/051171
§ 371 (c)(1),
(2) Date: Jul. 6, 2017

(87) PCT Pub. No.: WO2016/137532
PCT Pub. Date: Sep. 1, 2016

(65) Prior Publication Data
US 2018/0020462 A1   Jan. 18, 2018

Related U.S. Application Data

(60) Provisional application No. 62/121,118, filed on Feb. 26, 2015.

(51) Int. Cl.
*H04W 72/12* (2009.01)
*H04B 7/0417* (2017.01)
(Continued)

(52) U.S. Cl.
CPC ...... *H04W 72/1215* (2013.01); *H04B 7/0417* (2013.01); *H04W 16/14* (2013.01); *H04W 56/0005* (2013.01); *H04B 7/0621* (2013.01)

(58) Field of Classification Search
CPC ......... H04W 72/1215; H04W 56/0005; H04W 16/14; H04B 7/0417; H04B 7/0621
See application file for complete search history.

(56) References Cited

U.S. PATENT DOCUMENTS

2010/0111047 A1 * 5/2010 Yang ................ H04W 52/0216
370/336
2013/0039296 A1   2/2013 Damnjanovic et al.
(Continued)

FOREIGN PATENT DOCUMENTS

EP   2326119 A1   5/2011

OTHER PUBLICATIONS

Intel Corporation, "Resource allocation for D2D communication", R2-140312, 3GPP TSG RAN WG2 Meeting #85, Prague, Czech Republic, Feb. 10-14, 2014, 5 pages.
(Continued)

*Primary Examiner* — Jean B Corrielus
(74) *Attorney, Agent, or Firm* — Stoel Rives LLP

(57) ABSTRACT

User equipment and base stations can enable access to secondary radio access technology (S-RAT), a cross radio access technology (RAT) scheduling between a primary RAT (P-RAT) and a secondary RAT (S-RAT) and/or cross-scheduling in a same RAT with different optimizations and use/partition for different applications (e.g., a regular partition with a carrier resource (referred to as P-RAT) and an additional resource partition/region for device-to-device (D2D) or machine-type-communication (MTC) application (referred to as S-RAT)). Cross-RAT/partition-scheduling can include when S-RAT is scheduled by P-RAT or when P-RAT is scheduled by S-RAT.

18 Claims, 14 Drawing Sheets

(51) Int. Cl.
*H04W 16/14* (2009.01)
*H04W 56/00* (2009.01)
*H04B 7/06* (2006.01)

(56) References Cited

U.S. PATENT DOCUMENTS

| | | | | |
|---|---|---|---|---|
| 2014/0192664 | A1* | 7/2014 | Ericson | H04W 24/10 370/252 |
| 2015/0195766 | A1* | 7/2015 | Lee | H04W 28/0284 370/235 |
| 2015/0264703 | A1* | 9/2015 | Ratasuk | H04W 16/14 455/452.1 |
| 2016/0105902 | A1* | 4/2016 | Hirsch | H04B 7/024 370/329 |
| 2016/0128004 | A1* | 5/2016 | Lee | H04W 52/146 370/311 |
| 2016/0135213 | A1* | 5/2016 | Zhu | H04L 1/00 370/329 |
| 2016/0192200 | A1* | 6/2016 | Chin | H04L 43/04 455/405 |

OTHER PUBLICATIONS

PCT/US2015/051171, International Search Report and Written Opinion, dated Feb. 23, 2016, 17 pages.

* cited by examiner

Example UE

SYSTEMS, METHODS AND DEVICES FOR RADIO ACCESS TECHNOLOGY COORDINATION

RELATED APPLICATION

This application is a national phase application of International Patent Application No. PCT/US2015/051171, filed Sep. 21, 2015, which claims the benefit under 35 U.S.C. § 119(e) of U.S. Provisional Application No. 62/121,118 filed Feb. 26, 2015, both of which are incorporated by reference herein in their entirety.

TECHNICAL FIELD

The present disclosure relates to wireless device communication systems and more specifically relates to radio access technology coordination between multiple radio access technologies.

DETAILED DESCRIPTION OF PREFERRED EMBODIMENTS

Figure 1:
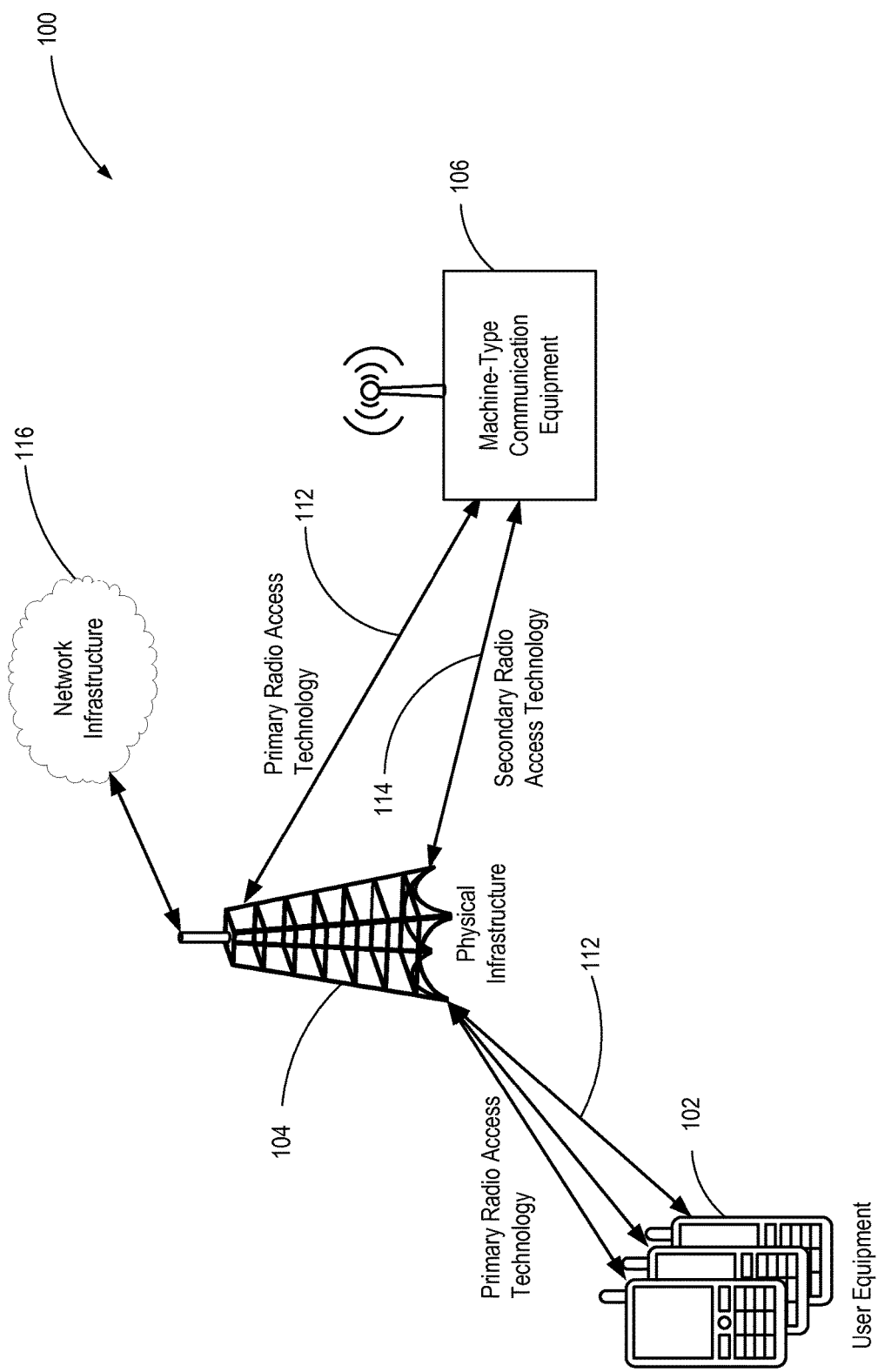
FIG. 1 is a schematic diagram illustrating radio access technology coordination system consistent with embodiments disclosed herein.

A detailed description of systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

Techniques, apparatus and methods are disclosed that enable access to secondary radio access technology (S-RAT), a cross radio access technology (RAT) scheduling between a primary RAT (P-RAT) and a secondary RAT (S-RAT) and/or cross-scheduling in a same RAT with different optimizations and use/partition for different applications (e.g., a regular partition with a carrier resource (referred to as P-RAT) and an additional resource partition/region for device-to-device (D2D) or machine-type-communication (MTC) application (referred to as S-RAT)). Cross-scheduling can include when S-RAT is scheduled by P-RAT or when P-RAT is scheduled by S-RAT.

In an access example, a UE acquires the downlink time and frequency synchronization to a P-RAT by detecting synchronization signals, e.g., PSS/SSS from P-RAT and then decodes the master information block (MIB) from physical broadcast channel (PBCH) and system information block (SIBs). After successful decoding of MIB or SIB on P-RAT, the UE obtains system information for access to S-RAT at least including the resource configuration in time and frequency (e.g., DL bandwidth, antenna configuration information, multicast-broadcast single-frequency network (MBSFN) configuration, frame structure configuration, absolute radio-frequency channel number (ARFCN) value to indicate the frequency of S-RAT etc.), and/or numerology, and configuration of downlink synchronization signal. The UE detects downlink synchronization signal in S-RAT within a search window which size is either fixed or configured by higher layers and then communicates with S-RAT.

In a scheduling example, when S-RAT is scheduled by P-RAT, two options can be considered for the DL cross-RAT scheduling: Cross-RAT scheduling or Cross-RAT-TTI scheduling. For cross-RAT scheduling, flexible access technology (FAT) physical downlink shared channel (PDSCH) (F-PDSCH) on S-RAT is transmitted within the same transmission time interval (TTI) when FAT physical downlink control channel (F-PDCCH) is transmitted on P-RAT. For cross-RAT-TTI scheduling, F-PDSCH on S-RAT is transmitted K P-TTI after F-PDCCH is transmitted on P-RAT.

In yet another example, cross-RAT or cross-RAT-TTI scheduling can apply in the case when P-RAT is scheduled by S-RAT.

Wireless mobile communication technology uses various standards and protocols to transmit data between a base station and a wireless mobile device. Wireless communication system standards and protocols can include the 3rd Generation Partnership Project (3GPP) long term evolution (LTE); the Institute of Electrical and Electronics Engineers (IEEE) 802.16 standard, which is commonly known to industry groups as worldwide interoperability for microwave access (WiMAX); and the IEEE 802.11 standard, which is commonly known to industry groups as Wi-Fi. In 3GPP radio access networks (RANs) in LTE systems, the base station can include Evolved Universal Terrestrial Radio Access Network (E-UTRAN) Node Bs (also commonly denoted as evolved Node Bs, enhanced Node Bs, eNodeBs, or eNBs) and/or Radio Network Controllers (RNCs) in an E-UTRAN, which communicate with a wireless communication device, known as user equipment (UE).

Mobile communication has evolved significantly from early voice systems to today's integrated communication platform. 4G LTE networks are deployed in more than 100 countries to provide service in various spectrum band allocations depending on spectrum regime.

A next generation wireless communication system, fifth generation or 5G, can be constructed with a goal to enable access to information and sharing of data anywhere, anytime by various users and applications. 5G can be configured to be a unified network/system configured to meet different and sometimes conflicting performance dimensions and services. Diverse multi-dimensional requirements can be driven by different services and applications.

A wide range of requirements, applications and services may be desirable in a 5G system. More specifically, higher data rates can be a key driver in network development and evolution for a 5G system. It is envisioned a peak data rate of more than 10 Gbps and a minimum guaranteed user data rate of at least 100 Mbps can be supported in a 5G system. In addition, support of a large number of Internet of Things (IoT) or Machine-Type Communication (MTC) devices can also feature in design of a 5G system. MTC devices used for many applications can be designed for low operational power consumption and can be designed to communicate with infrequent small burst transmissions.

In one embodiment, support of mission critical MTC applications for 5G system can be designed with extremely high level of reliable connectivity with guaranteed low latency, availability and reliability-of-service attributes.

Due to the conflicting requirements, and unlike the existing 2G, 3G and 4G, 5G can be configured to be more than one RAT. For instance, in order to cope with global mobile traffic expansion, higher frequency bands can be used where spectrum is available. The use of millimeter wave (mmWave) frequency bands ranging from 30 GHz to 300 GHz can provide scalability, capacity and density for a 5G system. In some embodiments, a new RAT may be defined for the mmWave band in order to achieve low latency and higher peak data rate.

Multi-RAT coordination for a 5G systems can include a procedure for 5G UEs to access to the secondary RAT (S-RAT), cross-RAT scheduling mechanisms in the case when S-RAT is scheduled by P-RAT and cross-RAT scheduling mechanisms in the case when P-RAT is scheduled by S-RAT.

It should be noted that most examples use a frequency division duplex (FDD) design to easily illustrate the design concepts and principles. However, it is straightforward to extend the proposed design to a time division duplex (TDD) system with relevant modifications, including corresponding TDD frame structure, DL/UL switching, etc.

Abbreviations

RAT represents a Radio Access Technology.
A P-RAT represents a Primary RAT.
An S-RAT represents a Secondary RAT.
TTI represents a transmission time interval.
S-TTI represents an S-RAT TTI.
P-TTI represents a P-RAT TTI.
FAT represents a Flexible Access Technology (FAT). FAT is a 5G flexible air interface access technology enabling support of multiple RATs/sub-RATs/partitions with a same or different numerologies multiplexed in a Time-division multiplexing (TDM) or Frequency-division multiplexing (FDM), code-division multiplex (CDM), spatial division multiplex (SDM) or a combination of above options and other possible orthogonal or non-orthogonal multiplexing.

F-PDCCH represents a FAT physical downlink control channel (F-PDCCH) which is the PDCCH channel used in a 5G air interface.

F-PDSCH represents a FAT physical downlink shared channel (F-PDSCH) which is the PDSCH channel used in a 5G air interface.

F-PUCCH represents a FAT physical uplink control channel (F-PUCCH) which is the PUCCH channel used in a 5G air interface.

F-PUSCH represents a FAT physical uplink shared channel (F-PUSCH) which is the PUSCH channel used in a 5G air interface.

F-PHICH represents a FAT physical hybrid-ARQ indicator channel (F-PHICH) which is the PHICH channel used in a 5G air interface.

FIG. 1 shows a system 100 for radio access technology coordination. Multiple UEs 102 can connect to a physical infrastructure 104 (such as eNBs, cell towers, network access points, etc.) over a P-RAT 112. The physical infrastructure 104 can receive or send wireless transmissions from or to the UEs 102. Based on the transmissions, the physical infrastructure 104 can provide access to a network infrastructure 116.

The physical infrastructure 104 can also support an S-RAT 114, which is scheduled over the P-RAT 112. An MCE 106 can transition from a low-power state to an active state. The MCE 106 can determine scheduling information for the S-RAT 114 from configuration transmissions over the P-RAT 112. Using this configuration information, the MCE 106 can transmit or receive information over the S-RAT 114.

The P-RAT 112 and S-RAT 114 can be optimized for different attributes. In one embodiment, the P-RAT 112 is optimized for high-throughput and the S-RAT 114 is optimized for battery conserving transmissions (e.g., low power transmissions, infrequent transmissions, etc.). These optimizations enable a unified network/system 100 configured to meet different and sometimes conflicting performance dimensions and services.

Figure 2:
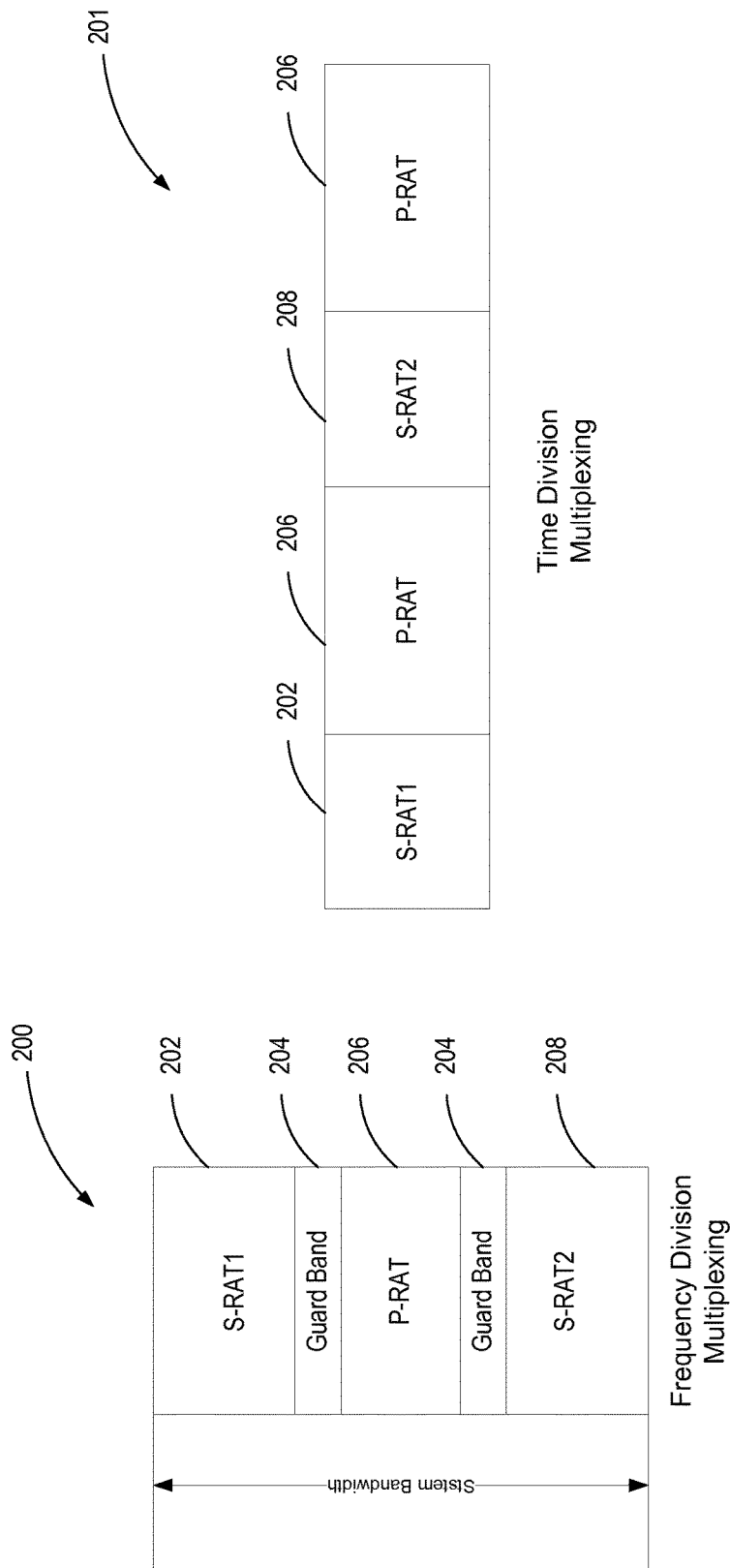
FIG. 2 is a diagram illustrating radio access technology multiplexing consistent with embodiments disclosed herein.

FIG. 2 shows multiplexing of multiple RATs. Multiple RATs, sub-RATs or partitions with same or different numerologies can be multiplexed in time division multiplexing (TDM) 201, frequency division multiplexing (FDM) 200, code division multiplexing (CDM), or space division multiplexing (SDM), or a combination of above options and other possible orthogonal or non-orthogonal multiplexing. FIG. 1 illustrates the multiplexing of multiple RATs in the FDM 200 and TDM 201 manner. Note that when multiple RATs are multiplexed in the FDM 200 manner, certain guard bands 204 may need to be inserted at the edge of frequency resources allocated for the RATs in order to minimize the inter-RAT interference.

In FIG. 2, a primary RAT (P-RAT) 206 normally operates at a lower sampling rate in order to save UE power consumption, while a secondary RAT (S-RAT) 202 or 208 can operate at a relatively higher sampling rate to support low latency applications, e.g., mission critical applications, tactile applications or vehicular to vehicular (V2V) applications.

In other application, the secondary RAT (S-RAT) 202 or 208 can operate at a lower sampling rate to reduce the synchronization requirement of the S-RAT 202 or 208, and enable larger number of devices sharing the channel/RAT or for energy saving.

In other application, the secondary RAT (S-RAT) 202 or 208 may operate at a same sampling rate using same or different waveform(s) from the P-RAT 206 to enable different applications.

Note that the P-RAT 206 and S-RAT 202 or 208 do not strictly imply to be different RATs. They may be based on the same RAT with different optimizations and use/partition for different applications, e.g., a regular partition with a carrier resource (referred to also as P-RAT) and an additional resource partition/region for D2D or MTC application (referred to also as S-RAT).

In one example, for carrier frequency below 6 GHz, the P-RAT 206 can reuse the existing LTE numerology, while the S-RAT 202 or 208 can be designed to support low latency application. In one option, the S-RAT 202 or 208 can also reuse the existing LTE numerology. To support low latency application, two to three OFDM symbols can be grouped together to achieve about a 0.2 ms sub-transmission time interval (TTI). In another option, the S-RAT 202 or 208 can be designed based on a larger subcarrier spacing than the P-RAT 206 subcarrier spacing, e.g., 75 KHz.

Figure 3:
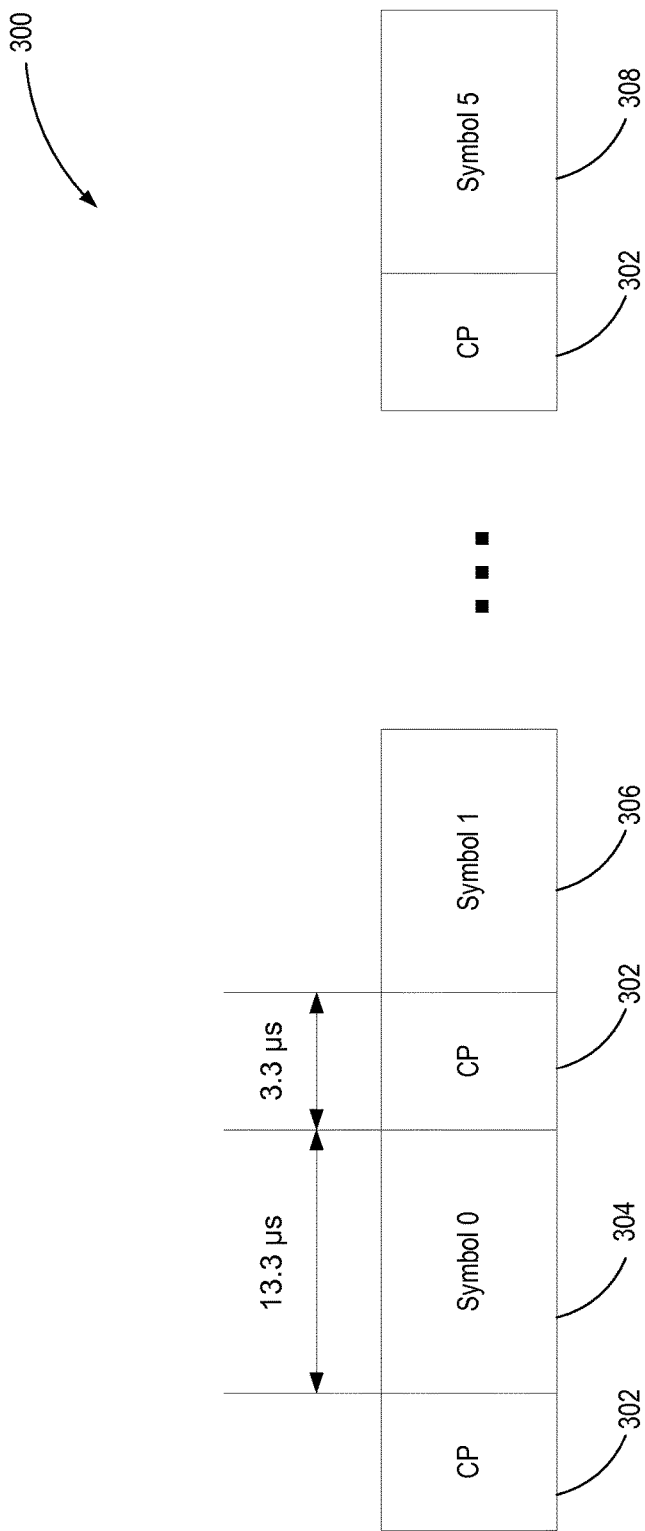
FIG. 3 is a diagram of a subframe structure for a secondary radio access technology consistent with embodiments disclosed herein.

FIG. 3 illustrates an example of a subframe structure 300 for S-RAT based on OFDM waveform. In the figure, 0.1 ms TTI can be achieved, and within one TTI, six OFDM symbols 304, 306 and 308 are grouped and cyclic prefix (CP) length 302 is ~3.3 us or 512 samples if sampling rate is 153.6 MHz. Note that the above example can be easily extended to support other TTIs. For instance, 12 OFDM symbols can be grouped to achieve 0.2 ms TTI. In other example, a different subcarrier spacing can be used (e.g., 60 KHz) to achieve a 0.1 ms or 0.2 ms TTI design with corresponding CP lengths and number of OFDM symbols.

Figure 4:
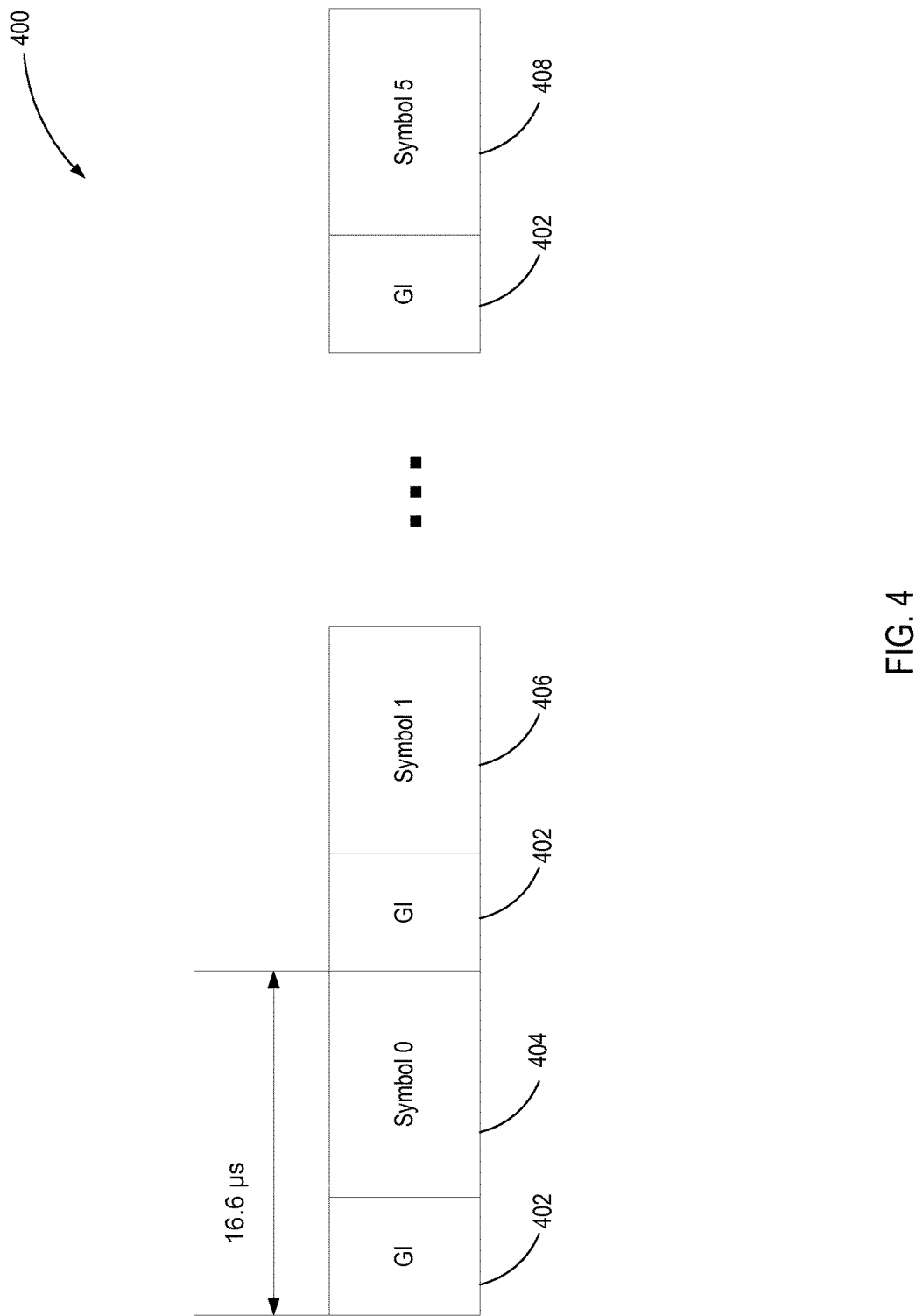
FIG. 4 is a diagram of a subframe structure for a secondary radio access technology using unique word (UW) discrete Fourier transform (DFT) spread orthogonal frequency-division multiplexing (OFDM) (UW-DFT-s-OFDM) consistent with embodiments disclosed herein.

FIG. 4 illustrates another example of a subframe structure 400 for S-RAT based on unique word (UW)-OFDM (UW-OFDM) waveform or UW-Discrete Fourier Transform (DFT) spread OFDM (UW-DFTs-OFDM) waveform. In this example, subcarrier spacing is 60 KHz and 12 OFDM symbols 404, 406 and 408 are grouped to achieve 0.1 ms TTI. In between symbols can be a guard interval (GI) 402. Note that, the example shown in FIG. 4 can be applied to other waveforms whose total symbol duration is fixed, i.e., the UW or GI 402 is within the FFT size or for the waveform there is no CP required to handle the delay spread in the communication system.

As mentioned above, in some embodiments P-RAT can operate at a lower sampling rate in order to save UE power consumption. In addition, S-RAT can operate as a stand-alone system or non-stand-alone system. In the latter embodiment, the UE has one RRC connection with the network via P-RAT. Systems using the S-RAT can rely on the P-RAT to provide necessary information for 5G UEs to access the S-RAT.

Figure 5:
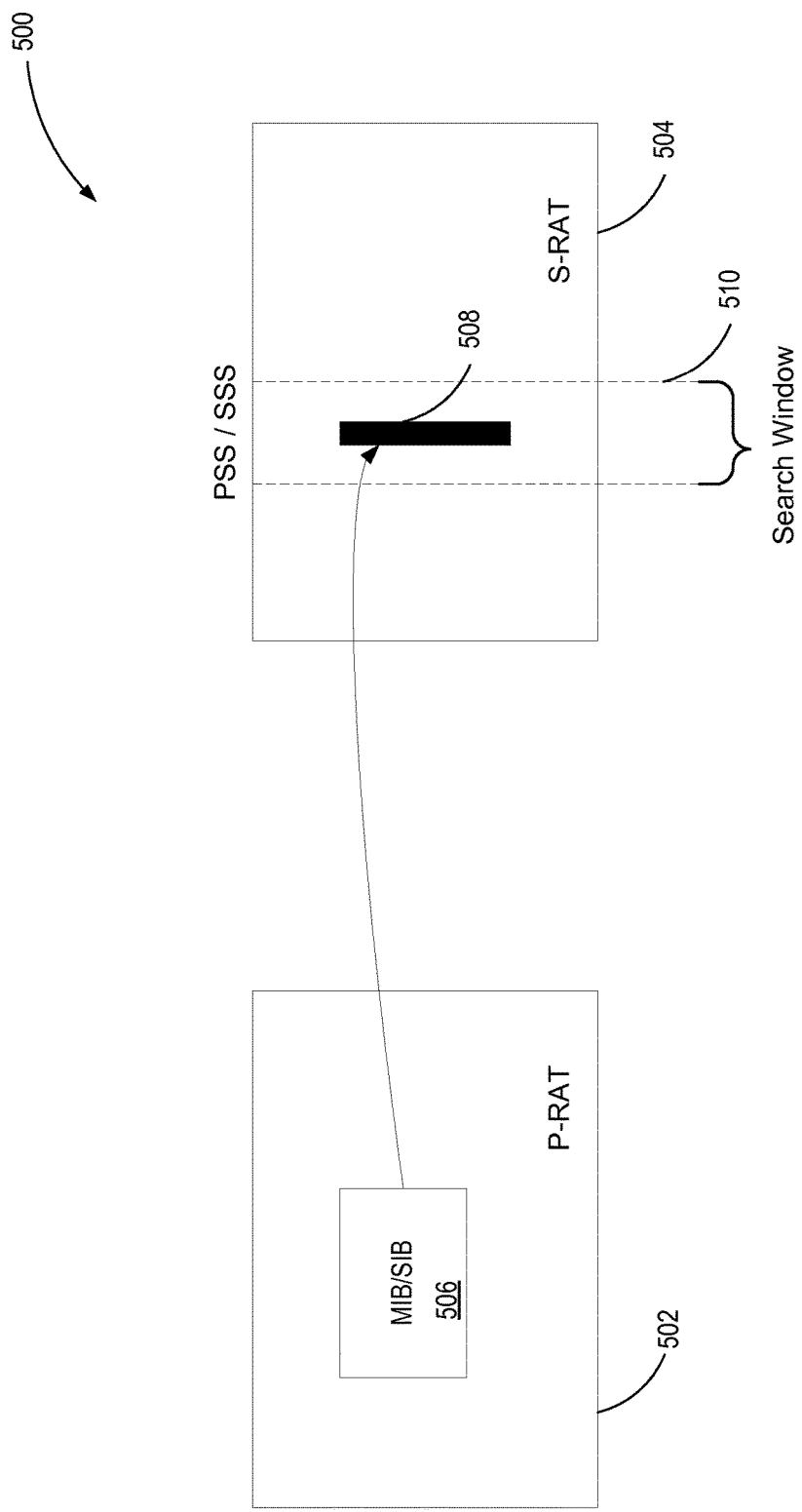
FIG. 5 is a diagram of a search window for downlink synchronization signal in secondary radio access technologies consistent with embodiments disclosed herein.

FIG. 5 is a diagram 500 that shows a small search window 510 for downlink synchronization in an S-RAT 504. In one embodiment, a procedure for 5G UEs to access to the S-RAT 504 can be designed as follows: (1) UE acquires the downlink time and frequency synchronization to a P-RAT 502 by detecting synchronization signals, e.g., PSS/SSS from the P-RAT 502 and then decodes a master information block (MIB) 506 from PBCH and system information block (SIB) 506. (2) After successful decoding of the MIB 506 or SIB 506 on the P-RAT 502, UEs obtain the necessary system information for access to the S-RAT 504 at least including the resource configuration in time and frequency (e.g., DL bandwidth, antenna configuration information, MBSFN configuration, frame structure configuration, ARFCN value to indicate the frequency of the S-RAT 504, etc.), and/or numerology, and configuration of downlink synchronization signal, i.e., physical cell identity and/or transmission offset between the P-RAT 502 and S-RAT 504. In another option, the relevant system information of the S-RAT 504 mentioned above can be provided to a UE by a dedicated RRC signaling. (3) The UE detects a downlink synchronization signal 508 in the S-RAT 504 within the search window 510, which size is either fixed or configured by higher layers and then communicates with the S-RAT 504. The system information obtained from the P-RAT 502, either by SIBs 506 on the P-RAT 502 or by a dedicated RRC signaling, can help the UE to access the S-RAT 504 in a more time and energy efficient manner.

In order to allow seamless coordination between the P-RAT 502 and S-RAT 504 and reduce the control channel blockage on the P-RAT 502 or S-RAT 504, cross-RAT scheduling can be considered. Note that enabling cross-RAT scheduling can be configured by UE-specific RRC signaling on a per-RAT and per-component-carrier basis. This is primarily due to the fact that different UEs may have different capabilities on the support of multiple RATs in a 5G system.

In general, depending on whether the P-RAT 502 or S-RAT 504 experiences strong interference, two cross-RAT scheduling mechanisms can be considered. (1) Cross-RAT scheduling in the case when the S-RAT 504 is scheduled by the P-RAT 502 or (2) Cross-RAT scheduling in the case when the P-RAT 502 is scheduled by the S-RAT 504. The detailed design of these two cross-RAT scheduling mechanisms is described in the following sections, respectively. Note that although cross-RAT scheduling mechanisms discussed below are based on the examples when the P-RAT 502 has 1 ms TTI and the S-RAT 504 has 0.2 ms TTI as mentioned above, the designs can be straightforwardly extended to the other cases of the P-RAT 502 and S-RAT 504 with same or different TTI values.

Cross-RAT Scheduling Mechanisms in the Case when S-RAT is Scheduled by P-RAT

In some embodiments, when S-RAT is scheduled by P-RAT, two options can be considered for the DL cross-RAT scheduling. With cross-RAT scheduling, F-PDSCH on S-RAT is transmitted within the same TTI when F-PDCCH is transmitted on P-RAT. With cross-RAT-TTI scheduling, F-PDSCH on S-RAT is transmitted K P-TTI after F-PDCCH is transmitted on P-RAT, i.e., F-PDCCH in P-TTI #n schedules the F-PDSCH in P-TTI #(n+K), where P-TTI is the TTI for P-RAT, e.g., 1 ms.

To support cross-RAT/cross-partition/cross-carrier or cross-RAT cross-partition/cross-carrier/cross-TTI scheduling, the following fields may be included on top of the existing DCI formats for DL assignment and uplink grant: S-RAT index (or partition index), carrier band index for S-RAT and/or TTI index in S-RAT. The S-RAT index (or partition index) can be provided by higher layer via MIB, SIB or UE specific dedicated RRC signaling. Similarly, carrier band index can be provided by higher layer via MIB, SIB or UE specific dedicated RRC signaling. This field is used to indicate which subframes in the S-RAT are used for DL or UL transmission. This can be represented in a form of bit-map. Further, the starting OFDM symbols in the transmission of F-PDSCH in S-RAT can be configured by higher layers, via MIB, SIB or UE specific dedicated RRC signaling.

DL HARQ for Cross-RAT Scheduling

Figure 6:
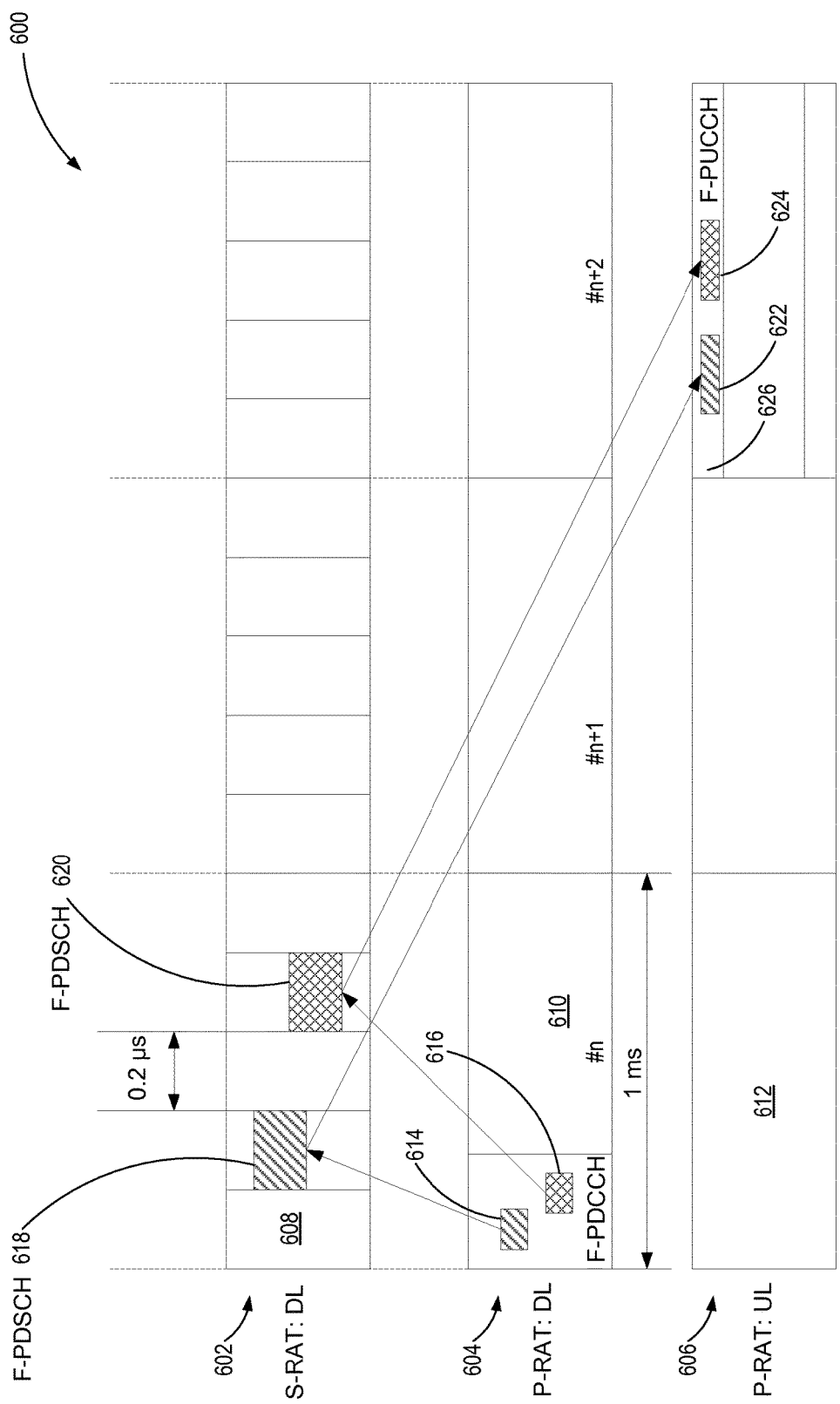
FIG. 6 is a diagram of downlink (DL) hybrid automatic repeat request (HARM) timing for cross-radio access technology (RAT) scheduling for multiple user equipments (UEs) consistent with embodiments disclosed herein.

FIG. 6 illustrates a DL hybrid automatic repeat request (HARQ) timing 600 for cross-RAT scheduling for multiple UEs for an FDD system using an S-RAT DL 602, a P-RAT DL 604 and a P-RAT UL 606. Note that in the figure, ACK/NACK feedback 622, 624 is transmitted on F-PUCCH 626 on P-RAT. Further, the gap between F-PDSCH 618, 620 on S-RAT and F-PUCCH 626 on P-RAT is L P-TTI. In this case, F-PDCCH 614, 616 transmitted on P-RAT schedules F-PDSCH transmission 618, 620 on S-RAT on P-TTI #n, ACK/NACK feedback 622, 624 is transmitted on F-PUCCH 626 on P-RAT on P-TTI #(n+L). In one example as shown in FIG. 6, L=2. This indicates that UE needs to feedback ACK/NACK 2 P-TTIs after receiving the F-PDSCH on S-RAT.

To determine the F-PUCCH resource index on P-RAT for ACK/NACK feedback 622, 624, several options can be considered. In one embodiment, the existing LTE PUCCH resource index determination rule in LTE can be reused, i.e., F-PUCCH resource index is given as a function of the first CCE in the F-PDCCH 614, 616 used to schedule the downlink transmission on S-RAT. In particular, the UE shall use $n_{PUCCH}^{(1)}=n_{CCE}+N_{PUCCH}^{(1)}$, where $n_{CCE}$ is the number of the first CCE (i.e., lowest CCE index used to construct the F-PDCCH) used for transmission of the corresponding DCI assignment and $N_{PUCCH}$ is configured by higher layers.

In another embodiment, S-TTI index can be included in the determination of the F-PUCCH resource index, i.e., $n_{PUCCH}^{(1)}=f(n_{CCE},N_{PUCCH}^{(1)},I_{S-TTI})$. $I_{S-TTI}$ is the S-TTI index. In one example, the F-PUCCH resource index can be determined by $n_{PUCCH}^{(1)}=n_{CCE}+N_{PUCCH}^{(1)}+c_0 \cdot I_{S-TTI}$ where $c_0$ is a constant, which can be predefined or configured in a cell-specific manner by higher layers.

In yet another embodiment, S-RAT index can be included in the determination of the F-PUCCH resource index, i.e., $n_{PUCCH}^{(1)}=f(n_{CCE},N_{PUCCH}^{(1)},I_{S-RAT})$ or $n_{PUCCH}^{(1)}=f(n_{CCE},N_{PUCCH}^{(1)},I_{S-TTI},I_{S-RAT})$ where $I_{S-RAT}$ is the S-RAT index. In one example, the F-PUCCH resource index can be determined by $n_{PUCCH}^{(1)}=n_{CCE}+N_{PUCCH}^{(1)}+c_1 \cdot I_{S-RAT}$ where $c_1$ is a constant, which can be predefined or configured in a cell-specific manner by higher layers. Note that this option may help to avoid the F-PUCCH resource collision on P-RAT from multiple UEs when F-PDSCH transmission from other UEs is scheduled on P-RAT and HARQ timing for self-RAT and cross-RAT scheduling is different.

In another embodiment, for an F-PDSCH transmission on the S-RAT indicated by the detection of a corresponding F-PDCCH on the P-RAT, the UE shall use F-PUCCH resource $n_{PUCCH}^{(1)}$ where the value of $n_{PUCCH}^{(1)}$ is determined according to higher layer configuration. More specifically, one of fields in DCI format of the corresponding F-PDCCH can be used to dynamically determine the F-PUCCH resources value from values configured by higher layers with a predefined mapping rule. For a F-PDSCH transmission only on the P-RAT indicated by the detection of a corresponding F-PDCCH on P-RAT, the UE shall use F-PUCCH $n_{PUCCH}^{(1)}$ with $n_{PUCCH}^{(1)}=n_{CCE}+N_{PUCCH}^{(1)}$ on the P-RAT, where $n_{CCE}$ is the number of the first CCE (i.e., lowest CCE index used to construct the F-PDCCH) used for transmission of the corresponding F-PDCCH and $N_{PUCCH}^{(1)}$ is configured by higher layers. Note that a single F-PDCCH on P-RAT can be used to schedule multiple F-PDSCH transmissions on S-RAT for single UE.

Figure 7:
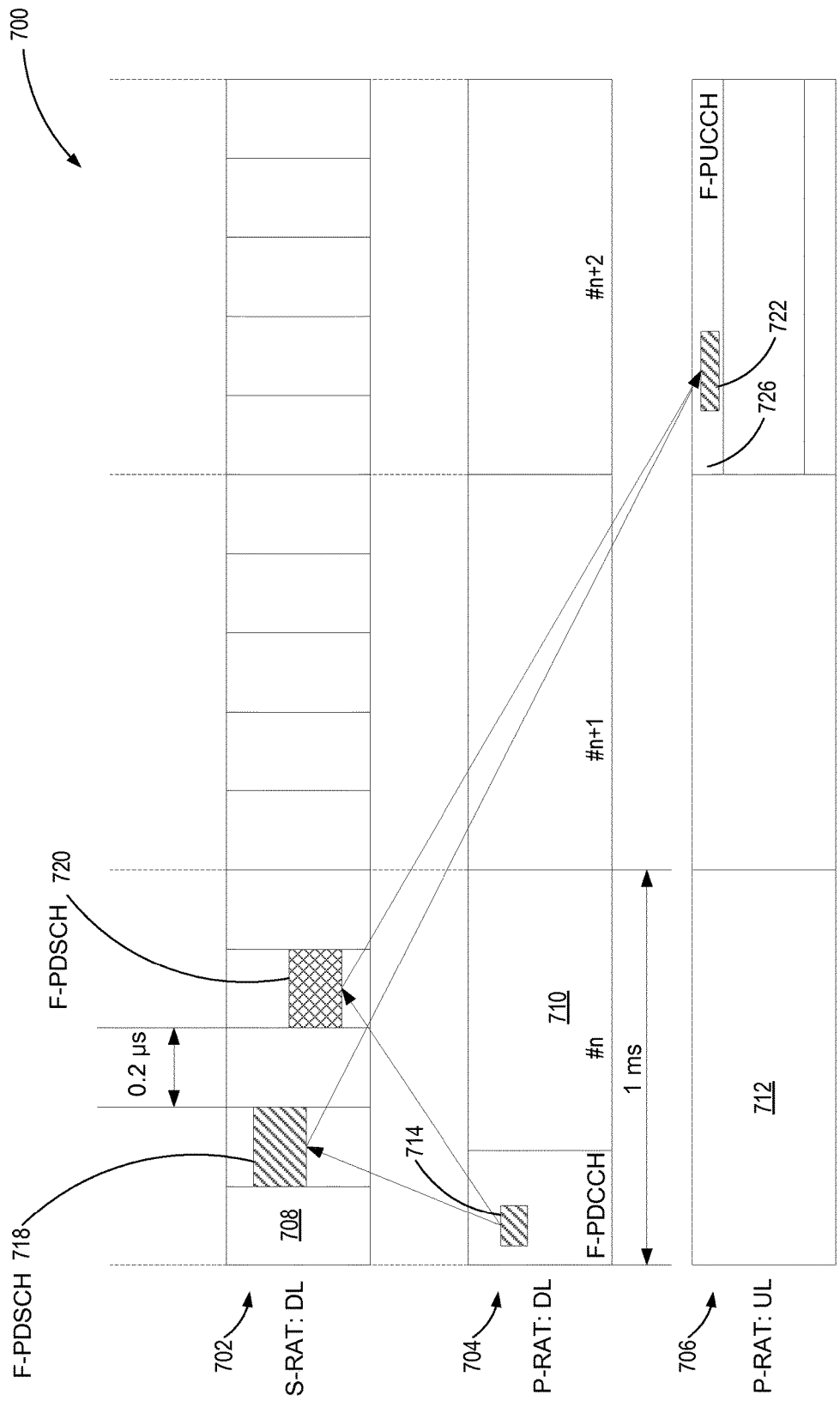
FIG. 7 is a diagram of downlink DL HARQ timing for cross-RAT scheduling for multiple flexible access technology (FAT) physical downlink share channel (PDSCH) (F-PDSCHs) for a single user equipment (UE) consistent with embodiments disclosed herein.

FIG. 7 illustrates a DL HARQ timing 700 for cross-RAT scheduling with multiple F-PDSCH transmissions 718, 720 for a single UE for FDD system using an S-RAT DL 702, a P-RAT DL 704 and a P-RAT UL 706. In the figure, two F-PDSCH transmissions 718, 720 are shown as an example.

The DL HARQ timing 600 as well as the determination rule of F-PUCCH resource index can be defined similar to the case for multiple UEs. To further reduce the scheduling overhead, a single F-PDCCH 714 can be used to schedule multiple F-PDSCH transmissions 718, 720 for one UE. More specifically, the S-TTI index, resource allocation, modulation and coding scheme (MCS), HARQ process number and redundancy version (RV) for the transmission of multiple F-PDSCH transmissions 718, 720 on S-RAT can be aggregated to form a single F-PDCCH 714.

Similarly, multiple ACK/NACK feedbacks 722 can be aggregated together on a single F-PUCCH transmission 726. In the case when P-RAT reuses the existing LTE, PUCCH format 1b, 2b with channel selection and format 3 can be considered for F-PUCCH transmission 726 depending on the number of configured component carriers for the transmission of F-PDSCH on S-RAT.

DL HARQ for Cross-RAT-TTI Scheduling

Figure 8:
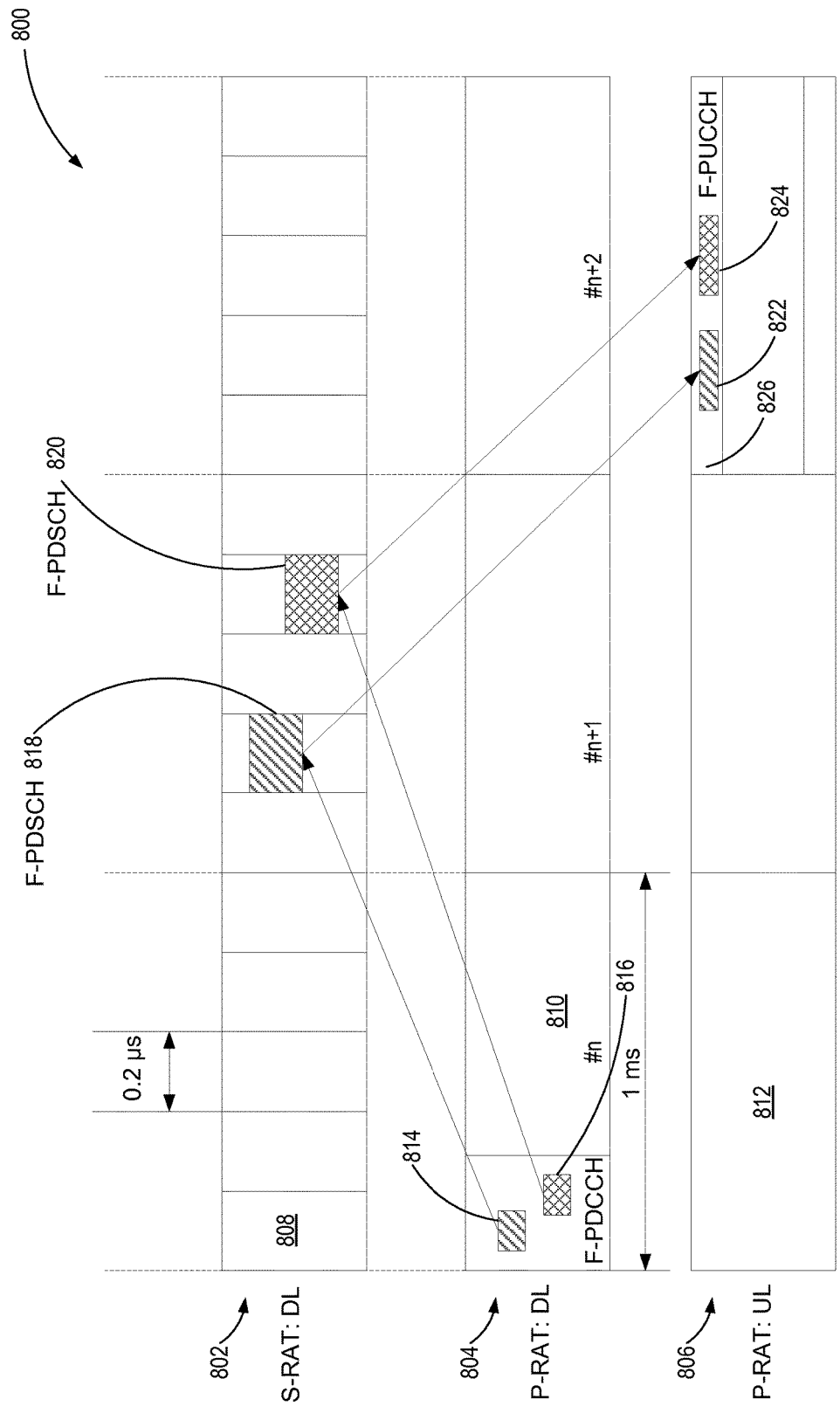
FIG. 8 is a diagram of DL HARQ timing for cross-RAT scheduling transmission time interval (TTI) for multiple UEs consistent with embodiments disclosed herein.

FIG. 8 illustrates a DL HARQ timing 800 for cross-RAT-TTI scheduling for multiple UEs for FDD system using an S-RAT DL 802, a P-RAT DL 804 and a P-RAT UL 806. In particular, F-PDCCH 814, 816 in P-TTI #n schedules F-PDSCH transmissions 818, 820 in P-TTI #(n+K). Subsequently, ACK/NACK feedback 822, 824 is transmitted on F-PUCCH 826 on P-RAT on P-TTI #(n+K+L). Note that this scheme may help reduce the IQ buffer size, thereby leading to lower UE cost and complexity.

In the example as shown in FIG. 8, K=1 and L=2. This indicates that F-PDCCH 814, 816 in P-TTI #n schedules F-PDSCH transmissions 818, 820 in P-TTI #(n+1) and ACK/NACK feedback 822, 824 is transmitted on F-PUCCH 826 on P-RAT on P-TTI #(n+3).

Similar to DL HARQ for cross-RAT scheduling, F-PDCCH 814, 816 on P-RAT can also be used to schedule multiple F-PDSCH transmissions 818, 820 on S-RAT for single UE based on cross-RAT-TTI scheduling. In addition, the same design principle for the determination of F-PUCCH resource index can also apply for the cross-RAT-TTI scheduling.

UL HARQ for Cross-RAT Scheduling

Figure 9:
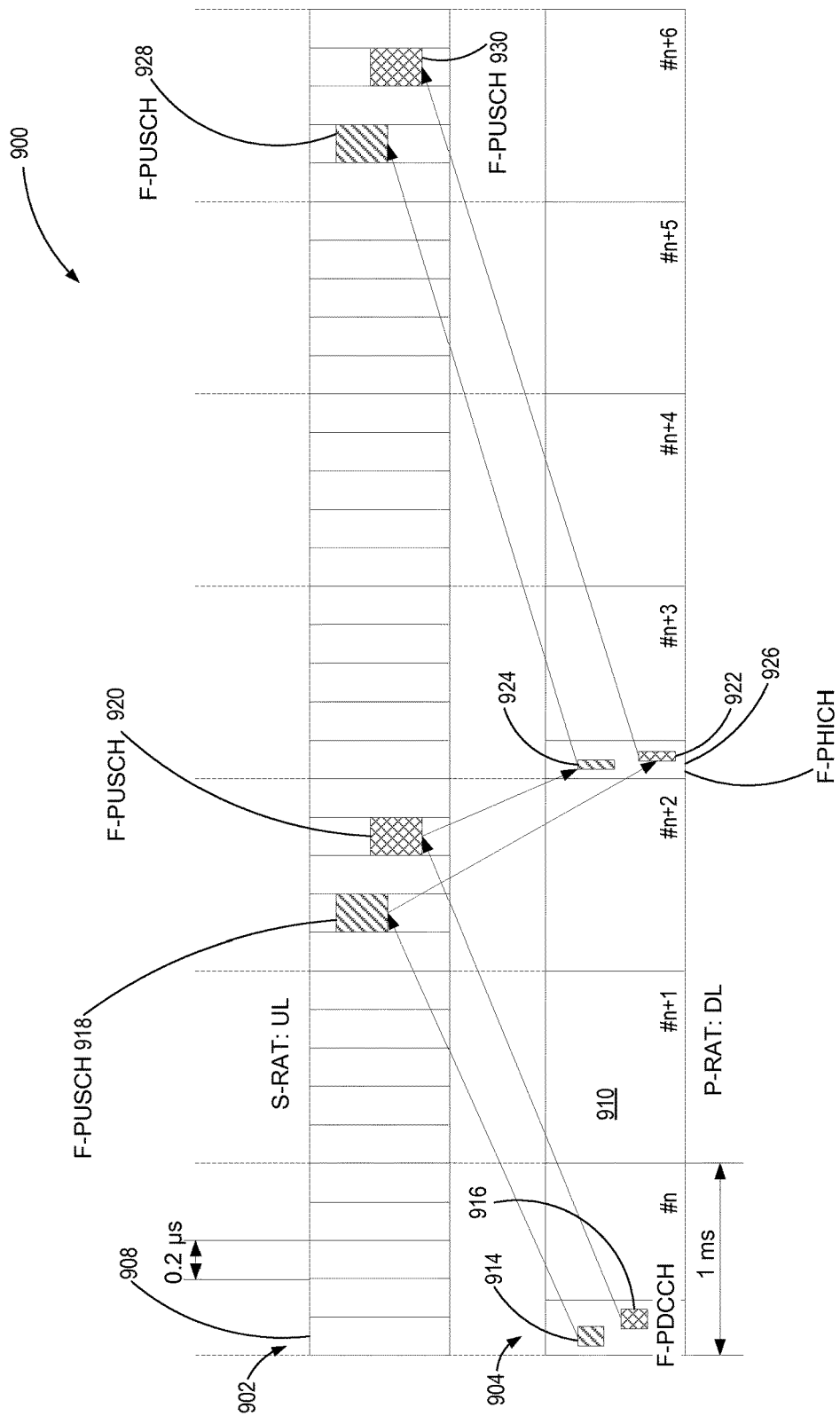
FIG. 9 is a diagram of uplink (UL) HARQ timing for cross-RAT scheduling for multiple UEs consistent with embodiments disclosed herein.

FIG. 9 illustrates a UL HARQ timing 900 for cross-RAT scheduling for multiple UEs using an S-RAT UL 902 and a P-RAT DL 904. In particular, the gap between F-PDCCH scheduling 914, 916 on P-RAT and F-PUSCH transmission 918, 920 on S-RAT is K_0 P-TTI. Subsequently, the gap between F-PUSCH transmission 918, 920 on S-RAT and ACK/NACK feedback 922, 924 on F-PHICH 926 or F-PDCCH on P-RAT is K_1 P-TTI. In the case for NACK, the gap between F-PUSCH retransmission 928, 930 and ACK/NACK feedback is K_0 P-TTI.

In the example as shown in FIG. 9, K_0=K_1=2. This indicates that F-PUSCH transmissions 918, 920 on S-RAT is transmitted 2 P-TTIs after P-PDCCH scheduling 914, 916 and ACK/NACK feedback 922, 924 transmitted on F-PHICH 926 on P-RAT is 2 P-TTIs after F-PUSCH transmission 918, 920.

To determine the F-PHICH resource index on P-RAT for ACK/NACK feedback 922, 924, several options can be considered as follows. In one embodiment, the existing PHICH resource index determination rule in LTE can be reused, i.e., the F-PHICH resource index is derived from the number of the first resource block upon which the corresponding uplink F-PUSCH transmission 918, 920 occurred. In addition, the resources used for a particular F-PHICH 926 further depend on the reference-signal phase rotation (cyclic shift for DM-RS associated with the F-PUSCH transmission 918, 920) signaled as part of the uplink grant. The F-PHICH resource is identified by the index pair ($n_{PHICH}^{group}$, $n_{PHICH}^{seq}$) where $n_{PHICH}^{group}$ is the PHICH group number and $n_{PHICH}^{seq}$ is the orthogonal sequence index within the group as defined by:

$$n_{PHICH}^{group} = (I_{PRB\_RA} + n_{DMRS}) \bmod n_{PHICH}^{group} + I_{PHICH} n_{PHICH}^{group}$$

$$n_{PHICH}^{seq} = (\lfloor I_{PRB\_RA}/N_{PHICH}^{group} \rfloor + n_{DMRS}) \bmod 2N_{SF}^{PHICH}$$

where $n_{DMRS}$ is mapped from the cyclic shift for DMRS field and $I_{PRB\_RA}$ is the lowest PRB index for the transmission of F-PUSCH transmissions 918, 920. Other parameters can be specified. Depending on the embodiment, eNB may need to assign appropriate resource and DM-RS cyclic shift for F-PUSCH transmission 918, 920 for multiple UEs on S-RAT in order to avoid resource collision for F-PHICH transmissions 922, 926.

In another embodiment of the invention, S-TTI index can be included in the determination of the F-PHICH resource index, i.e., $(n_{PHICH}^{group}, n_{PHICH}^{seq}) = f(I_{PRB\_RA}, n_{DMRS}, I_{S-TTI})$, where $I_{S-TTI}$ is the S-TTI index. In one example, the F-PHICH resource index can be determined by:

$$n_{PHICH}^{group} = (I_{PRB\_RA} + c_2 \cdot I_{S-TTI} + n_{DMRS}) \bmod n_{PHICH}^{group} + I_{PHICH} n_{PHICH}^{group}$$

$$n_{PHICH}^{seq} = (\lfloor I_{PRB\_RA} + c_2 \cdot I_{S-TTI})/N_{PHICH}^{group} \rfloor + n_{DMRS}) \bmod 2N_{SF}^{PHICH}$$

where $c_2$ is a constant, which can be predefined or configured in a cell-specific manner by higher layers.

In another embodiment, S-RAT index can be included in the determination of the F-PHICH resource index, i.e.,
$(n_{PHICH}^{group}, n_{PHICH}^{seq}) = f(I_{PRB\_RA}, n_{DMRS}, I_{S-RAT})$
$(n_{PHICH}^{group}, n_{PHICH}^{seq}) = f(I_{PRB\_RA}, n_{DMRS}, I_{S-TTI}, I_{S-RAT})$
where $I_{S-RAT}$ is the S-RAT index.

Note that similar to DL HARQ design for cross-RAT scheduling, single F-PDCCH can be used to schedule the transmission of F-PUSCH transmissions on S-RAT for single UE. More specifically, the S-TTI index, resource allocation, MCS, HARQ process number and redundancy version (RV) for the transmission of multiple F-PUSCHs on S-RAT can be aggregated to form a single F-PDCCH. Further, multiple ACK/NACK feedbacks can be aggregated together on single F-PDCCH transmission on P-RAT.

Cross-RAT Scheduling Mechanisms in the Case when P-RAT is Scheduled by S-RAT DL HARQ for Cross-RAT and Cross-RAT-TTI Scheduling Similar to the cross-RAT scheduling when S-RAT is scheduled by P-RAT, either cross-RAT or cross-RAT-TTI scheduling can apply in the case when P-RAT is scheduled by S-RAT. To support cross-RAT or cross-RAT-TTI scheduling, the following fields may be included on top of the existing DCI format for DL assignment and uplink grant: P-RAT index (or partition index) and/or carrier band index for P-RAT. The P-RAT index can be provided by higher layer via MIB, SIB or UE specific dedicated RRC signaling. Similarly, carrier band index can be provided by higher layer via MIB, SIB or UE specific dedicated RRC signaling. Further, the starting OFDM symbols in the transmission of F-PDSCH in P-RAT can be configured by higher layers, via MIB, SIB or UE specific dedicated RRC signaling.

Figure 10:
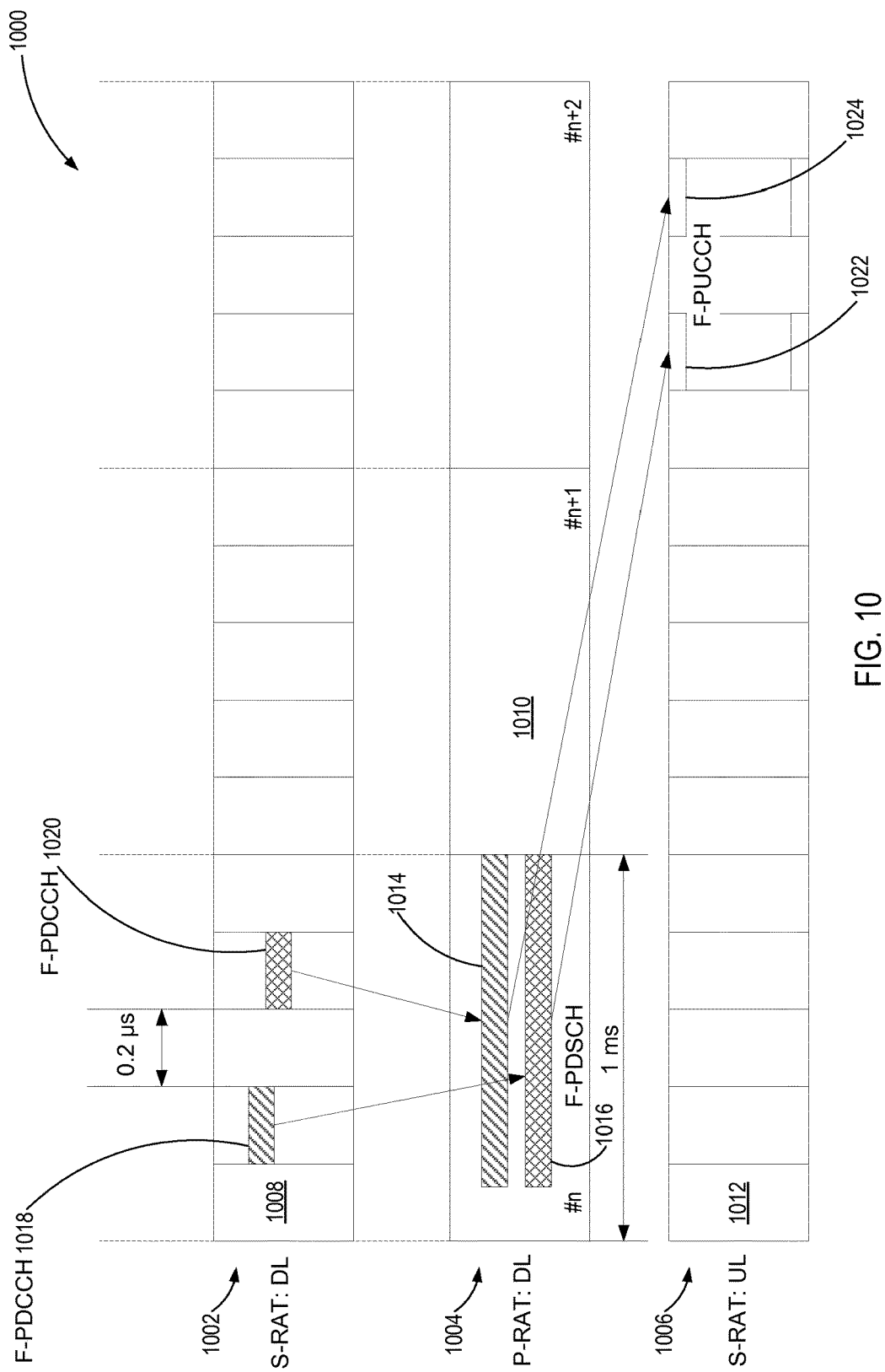
FIG. 10 is a diagram of DL HARQ timing for cross-RAT scheduling when a primary RAT (P-RAT) is scheduled by a secondary RAT (S-RAT) consistent with embodiments disclosed herein.

FIG. 10 illustrates a DL HARQ for cross-RAT scheduling 1000 when P-RAT is scheduled by S-RAT using an S-RAT DL 1002, a P-RAT DL 1004 and a S-RAT UL 1006. For cross-RAT scheduling, F-PDSCH transmissions 1014, 1016 on P-RAT is scheduled by F-PDCCH transmissions 1018, 1020 on S-RAT within the same P-TTI. In addition, the gap between F-PDSCH transmission 1014, 1016 on P-RAT and ACK/NACK feedback 1022, 1024 on F-PUCCH on S-RAT is K_0 P-TTIs. Note that to avoid resource allocation for F-PUCCH on S-RAT, the S-TTI index used for F-PDCCH transmission 1018, 1020 on S-RAT is the same as the S-TTI index for F-PUCCH transmission within the same P-TTI. For instance, F-PDCCH transmission 1018, 1020 in S-TTI #1 and P-TTI #n schedules the F-PDSCH transmission 1014, 1016 on P-TTI #n. The ACK/NACK 1022, 1024 for this F-PDSCH transmission 1014, 1016 is transmitted on F-PUCCH in S-TTI #1 and P-TTI #(n+K_0). Note that in the example as shown in FIG. 10, $K_0 = 2$.

Similar to the cross-RAT scheduling when S-RAT is scheduled by P-RAT, several options can be considered for the determination of F-PUCCH resource index. In particular, in one embodiment, the existing PUCCH resource index determination rule in LTE can be reused. In another embodiment, S-TTI index and/or S-RAT index can be included on the determination of the F-PUCCH resource index.

Further, the same design principle for cross-RAT-TTI scheduling when S-RAT is scheduled by P-RAT can apply for the cross-RAT-TTI scheduling when P-RAT is scheduled by S-RAT. In particular, the gap between F-PDCCH scheduling on S-RAT and F-PDSCH transmission on P-RAT is $K_1$ P-TTI.

UL HARQ for Cross-RAT Scheduling

Figure 11:
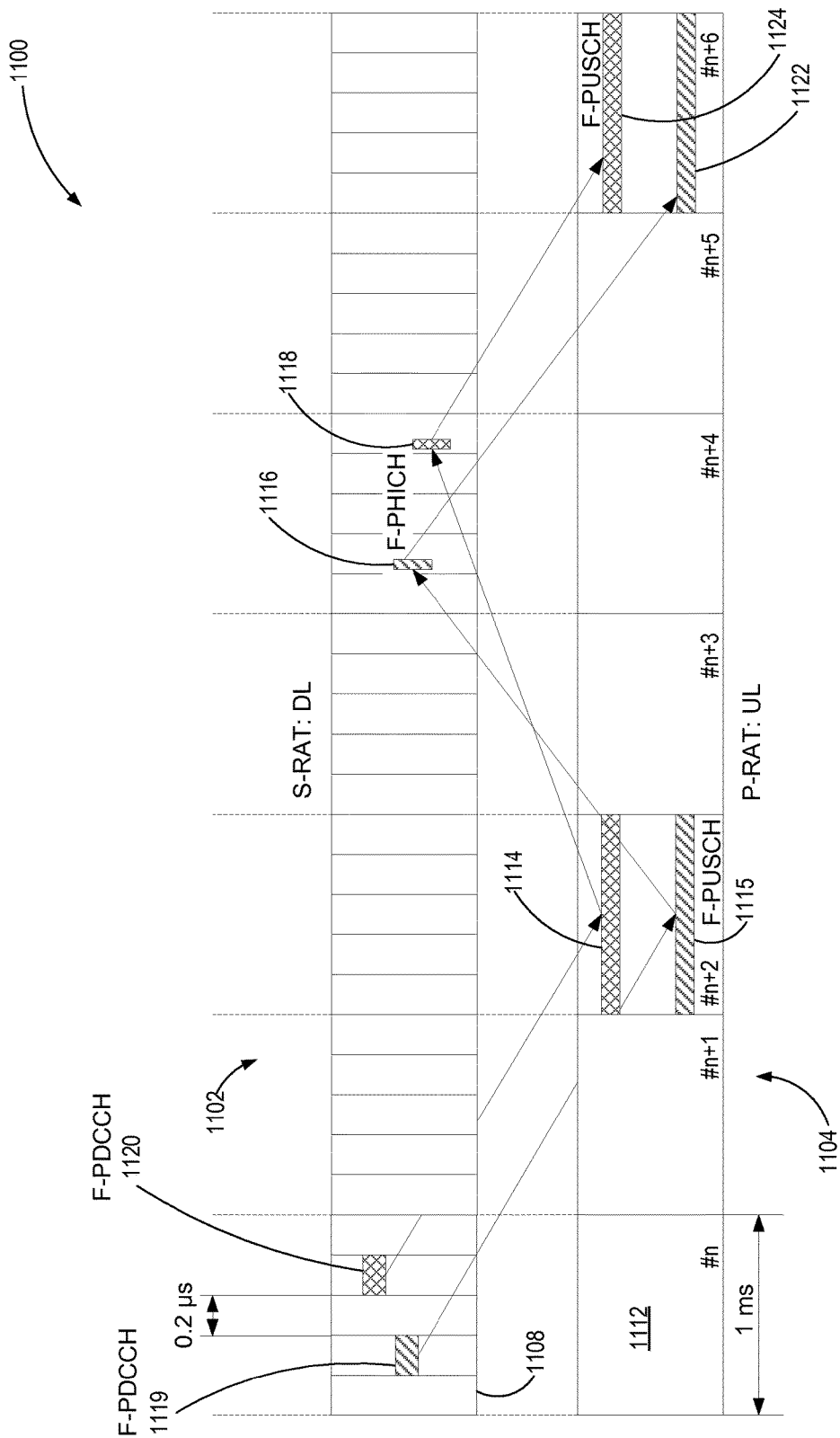
FIG. 11 is a diagram of UL HARQ timing for cross-RAT scheduling when P-RAT is scheduled by an S-RAT consistent with embodiments disclosed herein.

FIG. 11 illustrates a UL HARQ for cross-RAT scheduling 1100 when P-RAT is scheduled by S-RAT using an S-RAT DL 1102 and a P-RAT UL 1104. For cross-RAT scheduling, the gap between F-PDCCH scheduling 1119, 1120 on S-RAT and F-PUSCH transmission 1114, 1115 on P-RAT is $M_0$ P-TTI. Subsequently, the gap between F-PUSCH transmission 1114, 1115 on P-RAT and ACK/NACK feedback 1116, 1118 on F-PHICH or F-PDCCH on S-RAT is $M_1$ P-TTI. In the case for NACK, the gap between F-PUSCH retransmission 1122, 1124 and ACK/NACK feedback 1116, 1118 is $M_0$ P-TTI.

In the example as shown in FIG. 11, $M_0 = M_1 = 2$. This indicates that F-PUSCH transmission 1114, 1115 on P-RAT is transmitted 2 P-TTIs after F-PDCCH 1119, 1120 scheduling and ACK/NACK feedback 1116, 1118 transmitted on F-PHICH on S-RAT is 2 P-TTIs after F-PUSCH transmission 1114, 1115.

Note that to avoid resource allocation for F-PHICH on S-RAT, the S-TTI index used for F-PDCCH transmission 1119, 1120 on S-RAT is the same as the S-TTI index for F-PHICH or F-PDCCH transmission within the same P-TTI. For instance, F-PDCCH in S-TTI #1 and P-TTI #n schedules the F-PUSCH transmission on P-TTI #n+M_0. The ACK/NACK for this F-PUSCH is transmitted on F-PHICH in S-TTI #1 and P-TTI # (n+M_0+M_1).

Similar to the cross-RAT scheduling when S-RAT is scheduled by P-RAT, several options can be considered the determination of F-PHICH resource index. In particular, in one embodiment, the existing PHICH resource index determination rule in LTE can be reused. In another embodiment, S-TTI index and/or S-RAT index can be included on the determination of the F-PHICH resource index.

Figure 12:
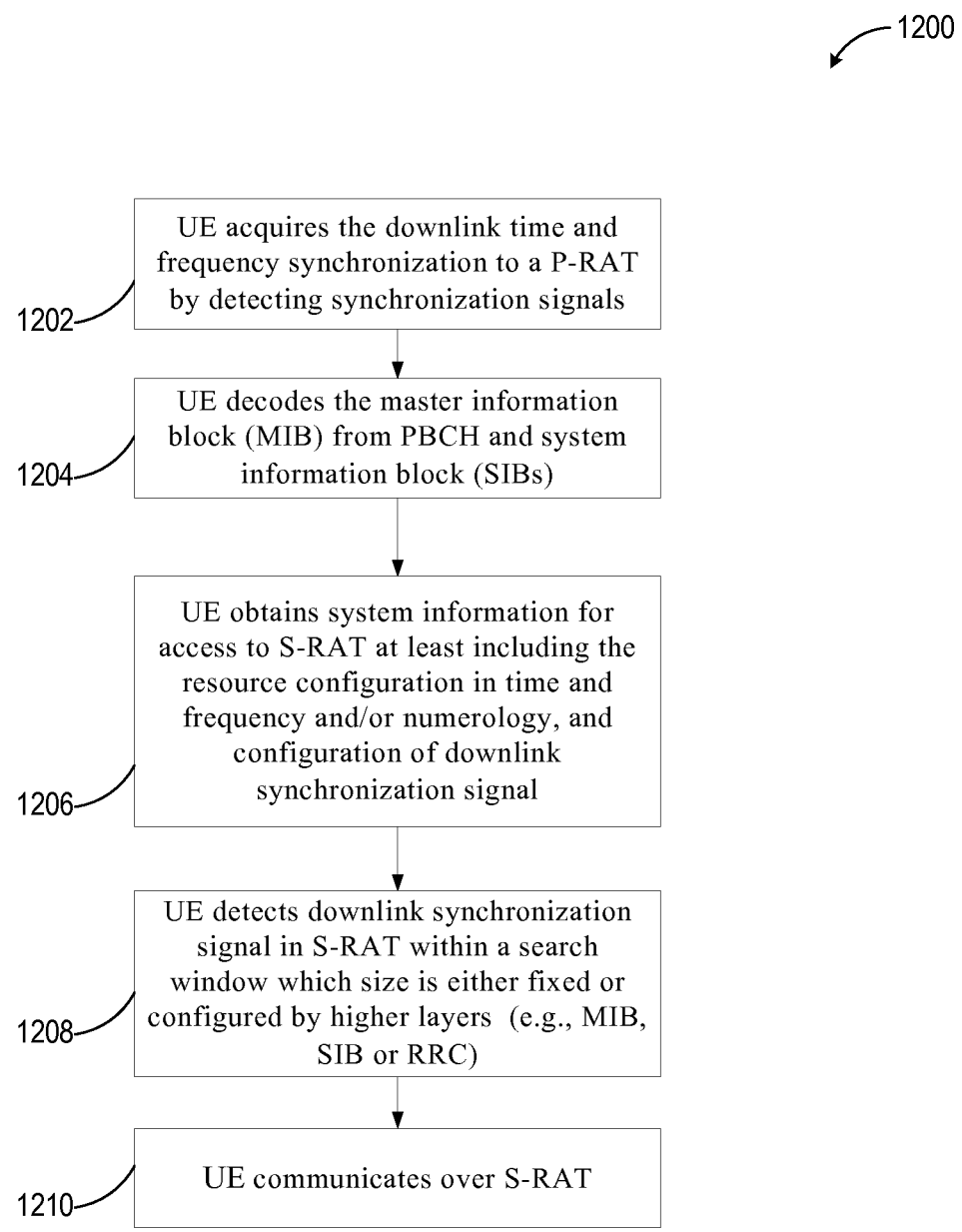
FIG. 12 is a flow chart illustrating a method of radio access technology coordination consistent with embodiments disclosed herein.

FIG. 12 is a flow chart illustrating a method of radio access technology coordination. The method can be accomplished by systems such as shown in FIG. 1, including MCE 106, physical infrastructure 104, P-RAT 112 and S-RAT 114. In block 1202, the UE acquires downlink time and frequency synchronization to a P-RAT by detecting synchronization signals. In block 1204, the UE decodes a master information block (MIB) from PBCH and SIBs. In block 1206, the UE obtains system information for access to S-RAT at least including the resource configuration in time and frequency and/or numerology, and configuration of downlink synchronization signal. In block 1208, the UE detects downlink synchronization signal in S-RAT within a search window. The search window size can be fixed or configured by higher layers (e.g., by MIB, SIB or RRC). In block 1210, the UE communicates over S-RAT.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Figure 13:
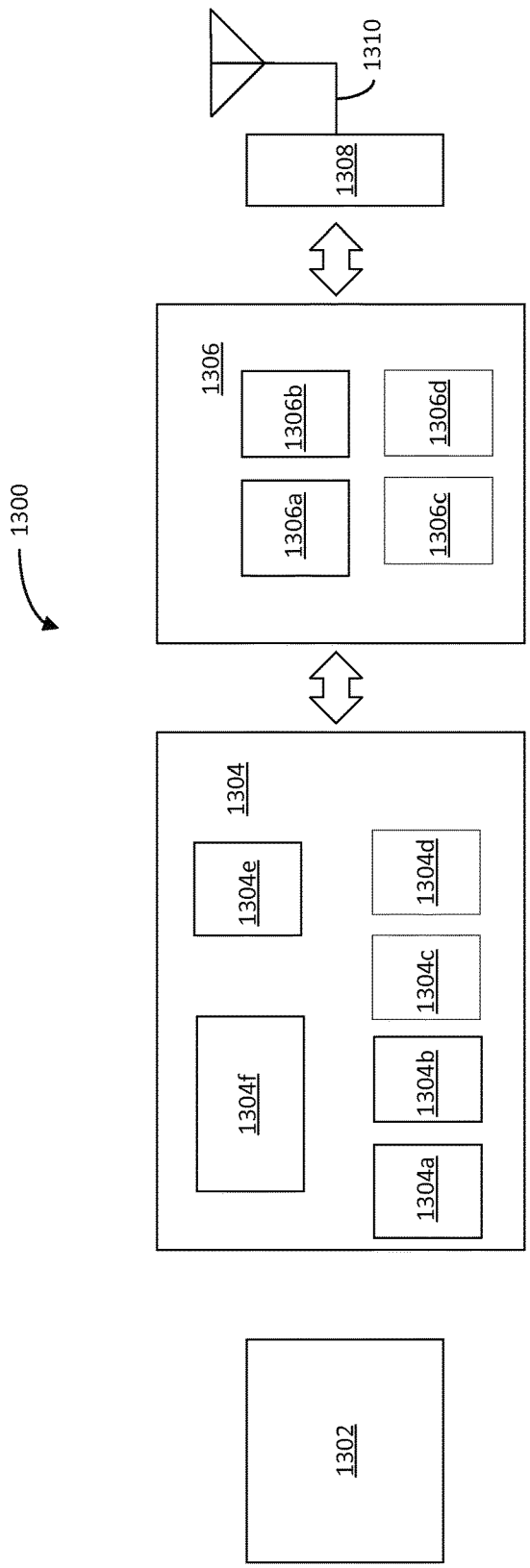
FIG. 13 is a diagram of example components of a user equipment (UE) device consistent with embodiments disclosed herein.

Embodiments described herein may be implemented into a system using any suitably configured hardware and/or software. FIG. 13 illustrates, for one embodiment, example components of a user equipment (UE) device 1300. In some embodiments, the UE device 1300 may include an application circuitry 1302, a baseband circuitry 1304, a Radio Frequency (RF) circuitry 1306, a front-end module (FEM) circuitry 1308 and one or more antennas 1310, coupled together at least as shown.

The application circuitry 1302 may include one or more application processors. For example, the application circuitry 1302 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 1304 may include circuitry such as, but not limited to, one or more single-core or multi-core processors. The baseband circuitry 1304 may include one or more baseband processors and/or control logic to process baseband signals received from a receive signal path of the RF circuitry 1306 and to generate baseband signals for a transmit signal path of the RF circuitry 1306. Baseband circuitry 1304 may interface with the application circuitry 1302 for generation and processing of the baseband signals and for controlling operations of the RF circuitry 1306. For example, in some embodiments, the baseband circuitry 1304 may include a second generation (2G) baseband processor 1304a, third generation (3G) baseband processor 1304b, fourth generation (4G) baseband processor 1304c, and/or other baseband processor(s) 1304d for other existing generations, generations in development or to be developed in the future (e.g., fifth generation (5G), 6G, etc.). The baseband circuitry 1304 (e.g., one or more of baseband processors 1304a-d) may handle various radio control functions that enable communication with one or more radio networks via the RF circuitry 1306. The radio control functions may include, but are not limited to, signal modulation/demodulation, encoding/decoding, radio frequency shifting, etc. In some embodiments, modulation/demodulation circuitry of the baseband circuitry 1304 may include Fast-Fourier Transform (FFT), precoding, and/or constellation mapping/demapping functionality. In some embodiments, encoding/decoding circuitry of the baseband circuitry 1304 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1304 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 1304e of the baseband circuitry 1304 may be configured to run elements of the protocol stack for signaling of the PHY, MAC, RLC, PDCP and/or RRC layers. In some embodiments, the baseband circuitry 1304 may include one or more audio digital signal processor(s) (DSP) 1304f. The audio DSP(s) 1304f may include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1304 and the application circuitry 1302 may be implemented together such as, for example, on a system on a chip (SOC).

In some embodiments, the baseband circuitry 1304 may provide for communication compatible with one or more radio technologies. For example, in some embodiments, the baseband circuitry 1304 may support communication with an evolved universal terrestrial radio access network (EUTRAN) and/or other wireless metropolitan area networks (WMAN), a wireless local area network (WLAN), or a wireless personal area network (WPAN). Embodiments in which the baseband circuitry 1304 is configured to support radio communications of more than one wireless protocol may be referred to as multi-mode baseband circuitry.

The RF circuitry 1306 may enable communication with wireless networks using modulated electromagnetic radiation through a non-solid medium. In various embodiments, the RF circuitry 1306 may include switches, filters, amplifiers, etc. to facilitate the communication with the wireless network. The RF circuitry 1306 may include a receive signal path which may include circuitry to down-convert RF signals received from the FEM circuitry 1308 and provide baseband signals to the baseband circuitry 1304. The RF circuitry 1306 may also include a transmit signal path which may include circuitry to up-convert baseband signals provided by the baseband circuitry 1304 and provide RF output signals to the FEM circuitry 1308 for transmission.

In some embodiments, the RF circuitry 1306 may include a receive signal path and a transmit signal path. The receive signal path of the RF circuitry 1306 may include a mixer circuitry 1306a, an amplifier circuitry 1306b and a filter circuitry 1306c. The transmit signal path of the RF circuitry 1306 may include the filter circuitry 1306c and mixer circuitry 1306*a*. The RF circuitry 1306 may also include a synthesizer circuitry 1306*d* for synthesizing a frequency for use by the mixer circuitry 1306*a* of the receive signal path and the transmit signal path. In some embodiments, the mixer circuitry 1306*a* of the receive signal path may be configured to down-convert RF signals received from the FEM circuitry 1308 based on the synthesized frequency provided by synthesizer circuitry 1306*d*. The amplifier circuitry 1306*b* may be configured to amplify the down-converted signals and the filter circuitry 1306*c* may be a low-pass filter (LPF) or band-pass filter (BPF) configured to remove unwanted signals from the down-converted signals to generate output baseband signals. Output baseband signals may be provided to the baseband circuitry 1304 for further processing. In some embodiments, the output baseband signals may be zero-frequency baseband signals, although this is not a requirement. In some embodiments, the mixer circuitry 1306*a* of the receive signal path may comprise passive mixers, although the scope of the embodiments is not limited in this respect.

In some embodiments, the mixer circuitry 1306*a* of the transmit signal path may be configured to up-convert input baseband signals based on the synthesized frequency provided by the synthesizer circuitry 1306*d* to generate RF output signals for the FEM circuitry 1308. The baseband signals may be provided by the baseband circuitry 1304 and may be filtered by the filter circuitry 1306*c*. The filter circuitry 1306*c* may include a low-pass filter (LPF), although the scope of the embodiments is not limited in this respect.

In some embodiments, the mixer circuitry 1306*a* of the receive signal path and the mixer circuitry 1306*a* of the transmit signal path may include two or more mixers and may be arranged for quadrature downconversion and/or upconversion respectively. In some embodiments, the mixer circuitry 1306*a* of the receive signal path and the mixer circuitry 1306*a* of the transmit signal path may include two or more mixers and may be arranged for image rejection (e.g., Hartley image rejection). In some embodiments, the mixer circuitry 1306*a* of the receive signal path may be arranged for direct downconversion and/or direct upconversion, respectively. In some embodiments, the mixer circuitry 1306*a* of the receive signal path and the mixer circuitry 1306*a* of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1306 may include analog-to-digital converter (ADC) and digital-to-analog converter (DAC) circuitry and the baseband circuitry 1304 may include a digital baseband interface to communicate with the RF circuitry 1306.

In some dual-mode embodiments, a separate radio IC circuitry may be provided for processing signals for each spectrum, although the scope of the embodiments is not limited in this respect.

In some embodiments, the synthesizer circuitry 1306*d* may be a fractional-N synthesizer or a fractional N/N+1 synthesizer, although the scope of the embodiments is not limited in this respect as other types of frequency synthesizers may be suitable. For example, the synthesizer circuitry 1306*d* may be a delta-sigma synthesizer, a frequency multiplier, or a synthesizer comprising a phase-locked loop with a frequency divider.

The synthesizer circuitry 1306*d* may be configured to synthesize an output frequency for use by the mixer circuitry 1306*a* of the RF circuitry 1306 based on a frequency input and a divider control input. In some embodiments, the synthesizer circuitry 1306*d* may be a fractional N/N+1 synthesizer.

In some embodiments, frequency input may be provided by a voltage controlled oscillator (VCO), although that is not a requirement. Divider control input may be provided by either the baseband circuitry 1304 or the applications circuitry 1302 depending on the desired output frequency. In some embodiments, a divider control input (e.g., N) may be determined from a look-up table based on a channel indicated by the applications circuitry 1302.

The synthesizer circuitry 1306*d* of the RF circuitry 1306 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, the synthesizer circuitry 1306*d* may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1306 may include an IQ/polar converter.

The FEM circuitry 1308 may include a receive signal path which may include circuitry configured to operate on RF signals received from one or more antennas 1310, amplify the received signals and provide the amplified versions of the received signals to the RF circuitry 1306 for further processing. The FEM circuitry 1308 may also include a transmit signal path which may include circuitry configured to amplify signals for transmission provided by the RF circuitry 1306 for transmission by one or more of the one or more antennas 1310.

In some embodiments, the FEM circuitry 1308 may include a TX/RX switch to switch between transmit mode and receive mode operation. The FEM circuitry 1308 may include a receive signal path and a transmit signal path. The receive signal path of the FEM circuitry 1308 may include a low-noise amplifier (LNA) to amplify received RF signals and provide the amplified received RF signals as an output (e.g., to the RF circuitry 1306). The transmit signal path of the FEM circuitry 1308 may include a power amplifier (PA) to amplify input RF signals (e.g., provided by RF circuitry 1306), and one or more filters to generate RF signals for subsequent transmission (e.g., by one or more of the one or more antennas 1310).

In some embodiments, the UE device 1300 may include additional elements such as, for example, memory/storage, display, camera, sensor, and/or input/output (I/O) interface.

Figure 14:
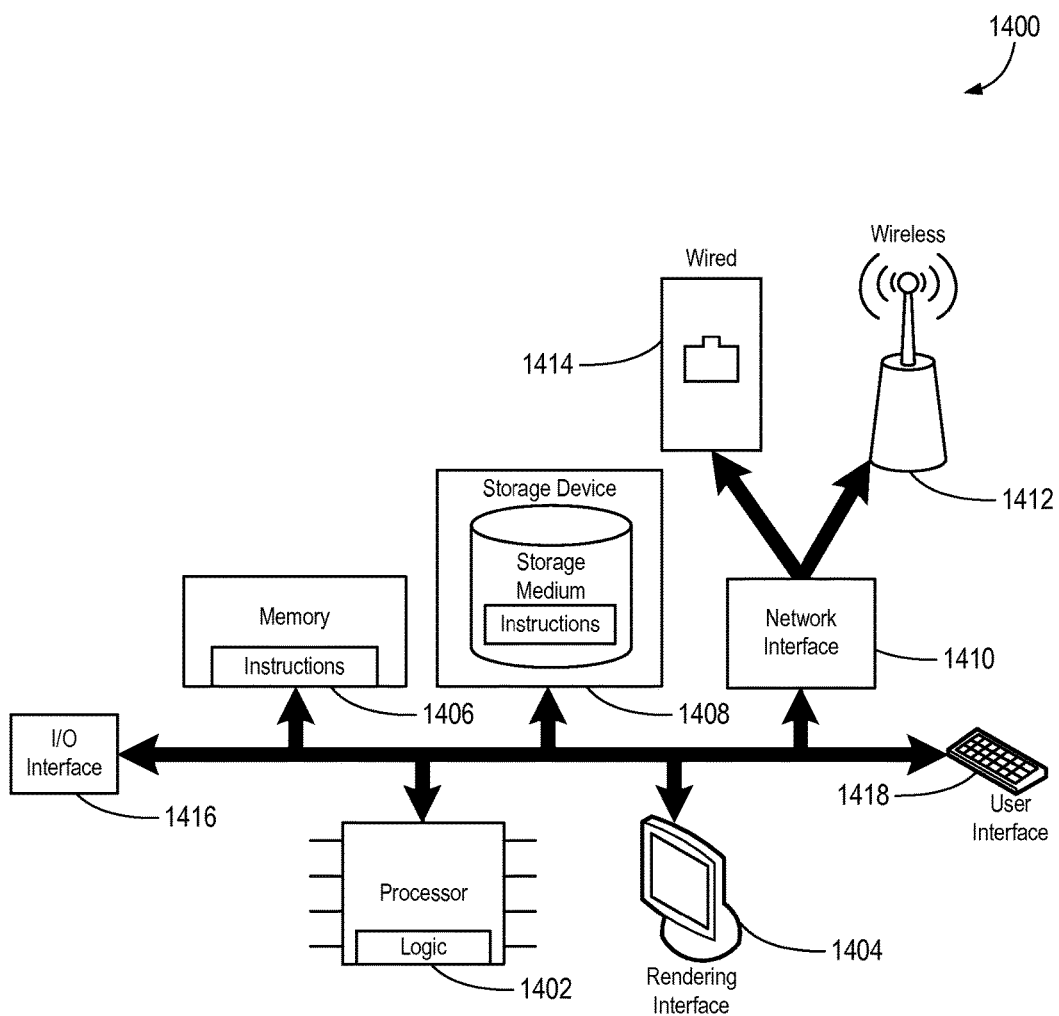
FIG. 14 is a schematic diagram of computing system consistent with embodiments disclosed herein.

FIG. 14 is a schematic diagram of a computing system 1400 consistent with embodiments disclosed herein. The computing system 1400 can be viewed as an information passing bus that connects various components. In the embodiment shown, the computing system 1400 includes a processor 1402 having logic 1402 for processing instructions. Instructions can be stored in and/or retrieved from a memory 1406 and a storage device 1408 that includes a computer-readable storage medium. Instructions and/or data can arrive from a network interface 1410 that can include wired 1414 or wireless 1412 capabilities. Instructions and/or data can also come from an I/O interface 1416 that can include such things as expansion cards, secondary buses (e.g., USB, etc.), devices, etc. A user can interact with the computing system 1400 though user interface devices 1418 and a rendering system 1404 that allows the computer to receive and provide feedback to the user.

EXAMPLES

The following examples pertain to further embodiments.

Example 1 is a user equipment (UE) comprising one or more wireless transceivers and circuitry. The one or more wireless transceivers are configured to communicate using a first radio access technology (RAT) and a second RAT, wherein the first RAT and second RAT are serviced by one or more enhanced node Bs (eNBs). The circuitry is configured to receive from one of the one or more eNBs scheduling information for the second RAT using the first RAT. The circuitry is further configured to receive or transmit a message according to the scheduling information using the second RAT.

In Example 2, the first RAT and the second RAT of Example 1 can optionally use a same radio access technology.

In Example 3, the first RAT and the second RAT of Example 1 can optionally use different radio access technologies.

In Example 4, the UE in Examples 1-3 can optionally have the first RAT be a primary RAT (P-RAT), the second RAT be a secondary RAT (S-RAT) and the P-RAT provide scheduling information for the S-RAT.

In Example 5, the UE in Examples 1-4 can optionally transmit flexible access technology physical downlink shared channel (F-PDSCH) on S-RAT within the same P-RAT transmission time interval (P-TTI) when flexible access technology physical downlink control channel (F-PDCCH) is transmitted on P-RAT.

In Example 6, the UE of Examples 1-5 can optionally transmit flexible access technology physical downlink shared channel (F-PDSCH) on S-RAT after an integer number of P-RAT transmission time intervals (P-TTIs) when flexible access technology physical downlink control channel (F-PDCCH) is transmitted on P-RAT.

In Example 7, the UE of Examples 1-6 can optionally transmit scheduling information that further comprises downlink control information that includes downlink assignment and uplink grant information, the downlink assignment and uplink grant information further comprising S-RAT index, carrier band index for S-RAT and transmission time interval (TTI) index in S-RAT.

In Example 8, the UE in Examples 1-7 can optionally have the first RAT be a secondary RAT (S-RAT), the second RAT be a primary RAT (P-RAT) and the S-RAT provide scheduling information for the P-RAT.

In Example 10, the UE of Examples 1-9 can optionally have circuitry configured to receive or transmit a message according to the scheduling information using the second RAT further comprises to transmit the message using the second RAT and receive a response, using the first RAT, indicating whether the message was successfully received by the one or more eNBs using the second RAT.

In Example 11, the UE of Examples 1-9 can optionally include circuitry for receiving acknowledgement/negative acknowledgement (ACK/NACK) feedback using the first RAT flexible access technology physical uplink control channel (F-PUCCH); and wherein a timing gap between flexible access technology physical downlink shared channel (F-PDSCH) on the second RAT and flexible access technology physical uplink control channel (F-PUCCH) on the first RAT is an integer number of transmission time intervals (TTIs) of the first RAT.

In Example 12, the UE of Examples 1-11 can optionally include circuitry for receiving the message using the second RAT and transmit a response, using the first RAT, indicating whether the message was successfully received by the one or more eNBs using the second RAT.

In Example 13, the UE of Examples 1-11 can optionally include circuitry for determining downlink time and frequency synchronization to the first RAT, decoding a master information block (MIB) and system information block (SIB) to determine access information for the second RAT and detect a downlink synchronization signal within a search window of the second RAT.

In Example 14, the search window of Example 13 can optionally be fixed.

In Example 15, a configuration of the search window of Example 13 can optionally be provided by the MIB, SIB or radio resource control (RRC) signaling.

Example 16 is a computer program product comprising a computer-readable storage medium storing program code for causing one or more processors to perform a method. The method includes transmitting scheduling information using a first radio access technology (RAT) partition for a second RAT partition; and receiving from a user equipment (UE) or transmit to a UE a message according to the scheduling information using the second RAT partition.

In Example 17, the first RAT partition and the second RAT partition of Example 16 can optionally use a same radio access technology.

In Example 18, the first RAT partition and the second RAT partition of Example 16 can optionally use different radio access technologies.

In Example 19, the scheduling information of Example 16 can optionally comprise resource configuration in time and frequency for the second RAT partition, downlink (DL) bandwidth; antenna configuration information; multicast-broadcast single-frequency network (MBSFN) configuration, frame structure configuration, absolute radio-frequency channel number (ARFCN) value, numerology for the second RAT partition, or configuration of a downlink synchronization signal.

In Example 20, the transmitting of scheduling information of Example 16 can optionally comprise configuring, via master information block (MIB), system information block (SIB) or radio resource control (RRC) signaling, starting orthogonal frequency-division multiplexing (OFDM) symbols in the transmission of flexible access technology physical downlink share channel (F-PDSCH) using the second RAT partition.

In Example 21, the method of Examples 16-20 can optionally include indicating, using the first RAT partition, whether the message was successfully received using the second RAT partition.

In Example 22, the method of Example 21 is optionally includes transmitting acknowledgement/negative acknowledgement (ACK/NACK) feedback using the first RAT partition flexible access technology physical uplink control channel (F-PUCCH), wherein a timing gap between flexible access technology physical downlink shared channel (F-PDSCH) on the second RAT partition and flexible access technology physical uplink control channel (F-PUCCH) on the first RAT partition is an integer number of transmission time intervals (TTIs) of the first RAT partition.

In Example 23, the method of Examples 16-22 can optionally include determining the second RAT transmission time interval (TTI) index and the flexible access technology physical uplink control channel (F-PUCCH).

In Example 24, the method of Examples 16-23 can optionally include determining the second RAT index and the flexible access technology physical uplink control channel (F-PUCCH).

In Example 25, the method of Examples 16-23 can optionally include using a flexible access technology physical downlink control channel (F-PDCCH) transmission to schedule multiple flexible access technology physical downlink shared channel (F-PDSCH) transmissions on the second RAT for the UE.

In Example 26, the method of Example 25 can optionally include aggregating an S-TTI index, resource allocation, modulation and coding scheme (MCS), hybrid automatic repeat request (HARM) process number and redundancy version (RV) for the transmission of multiple F-PDSCHs on S-RAT.

In Example 27, the method of Examples 16-26 can optionally include scheduling a flexible access technology physical downlink control channel (F-PDCCH) transmission; scheduling a flexible access technology physical downlink shared channel (F-PDSCH) transmission in an integer number of first RAT transmission time intervals (TTIs) after the F-PDCCH transmission; and scheduling an acknowledgement/negative acknowledgement (ACK/NACK) feedback using a flexible access technology physical uplink control channel (F-PUCCH) transmission in an integer number of first RAT transmission time intervals (TTIs) after the F-PDSCH transmission.

In Example 28, the method in Examples 16-27 can optionally include scheduling a first timing gap between a flexible access technology physical downlink control channel (F-PDCCH) transmission using the first RAT partition and a flexible access technology physical uplink shared channel (F-PUSCH) transmission using the second RAT partition, the first timing gap being a first integer of first RAT TTIs. The method can further optionally include scheduling a second timing gap between the F-PUSCH transmission using the second RAT partition and an acknowledgement/negative acknowledgement (ACK/NACK) feedback using the flexible access technology physical hybrid-ARQ indicator channel (F-PHICH) or F-PDCCH, the second timing gap being a second integer of first RAT TTIs. When a NACK feedback is transmitted, the method can also optionally include scheduling a third timing gap between the F-PHICH transmission or F-PDCCH transmission and a F-PUSCH retransmission, the third timing gap equal to the first timing gap.

Example 29 is a wireless device configured to determine downlink time and frequency synchronization information for a primary radio access technology (P-RAT) provided by one or more base stations. The wireless device can also be configured to decode access information data provided by the one or more base stations using the P-RAT for a secondary radio access technology (S-RAT). The wireless device can further be configured to detect downlink synchronization signal using the S-RAT within a search window provided by the one or more base stations; and transmit or receive data using the S-RAT to the one or more base stations based at least in part on the access information from the P-RAT.

In Example 30, the wireless device in Example 29 can optionally be configured such that a flexible access technology physical downlink shared channel (F-PDSCH) transmission on S-RAT is transmitted within the same P-RAT transmission time interval (P-TTI) when a flexible access technology physical downlink control channel (F-PDCCH) transmission is transmitted on P-RAT In Example 31, the wireless device in Example 29 can optionally be configured such that a flexible access technology physical downlink shared channel (F-PDSCH) transmission on S-RAT is transmitted after an integer number of P-RAT transmission time intervals (P-TTIs) when a flexible access technology physical downlink control channel (F-PDCCH) transmission is transmitted on P-RAT.

In Example 32, the scheduling information in Example 29 can optionally include downlink control information that includes downlink assignment and uplink grant information, the downlink assignment and uplink grant information further comprising S-RAT index, carrier band index for S-RAT and transmission time interval (TTI) index in S-RAT.

Example 33 is an enhanced node B (eNB) configured to transmit, using a first fifth generation (5G) wireless network partition, downlink scheduling information for a user equipment (UE) to receive a message using a second 5G network partition; transmit the message using the second 5G network partition based at least in part on the downlink scheduling information; and receive a message indicating whether the message was successfully received by the UE.

In Example 34, the eNB of Example 33 can optionally be configured such that the first 5G wireless network partition and second 5G wireless network partition use different RATs.

In Example 35, the eNB of Example 34 can optionally be configured such that the first 5G wireless network partition and second 5G wireless network partition use a same RAT.

In Example 36, the scheduling information of Examples 33-35 can optionally include resource configuration in time and frequency for the second 5G wireless network partition, downlink (DL) bandwidth, antenna configuration information, multicast-broadcast single-frequency network (MBSFN) configuration, frame structure configuration, absolute radio-frequency channel number (ARFCN) value, numerology for the second 5G wireless network partition, or configuration of a downlink synchronization signal.

In Example 37, the eNB of Examples 33-35 can optionally be configured to configure, via master information block (MIB), system information block (SIB) or radio resource control (RRC) signaling, starting orthogonal frequency-division multiplexing (OFDM) symbols in the transmission of flexible access Technology physical downlink share channel (F-PDSCH) using the second 5G wireless network partition.

In Example 38, the eNB of Examples 33-37 can optionally be configured to indicate, using the first 5G wireless network partition, whether the message was successfully received using the second 5G wireless network partition.

In Example 39, the eNB of Examples 33-38 can optionally be configured to transmit acknowledgement/negative acknowledgement (ACK/NACK) feedback using the first 5G wireless network partition flexible access technology physical uplink control channel (F-PUCCH), wherein a timing gap between flexible access technology physical downlink shared channel (F-PDSCH) on the second 5G wireless network partition and flexible access technology physical uplink control channel (F-PUCCH) on the first 5G wireless network partition is an integer number of transmission time intervals (TTIs) of the first 5G wireless network partition.

In Example 40, the eNB of Examples 33-39 can optionally be configured to determine the second 5G wireless network transmission time interval (TTI) index and the flexible access technology physical uplink control channel (F-PUCCH).

In Example 41, the eNB of Examples 33-40 can optionally be configured to determine the second 5G wireless network index and the flexible access technology physical uplink control channel (F-PUCCH).

In Example 42, the eNB of Examples 33-41 can optionally be configured to determine the second 5G wireless network index and the flexible access technology physical uplink control channel (F-PUCCH).

In Example 43, the eNB of Examples 33-43 can optionally be configured to aggregate an S-TTI index, resource allocation, modulation and coding scheme (MCS), hybrid automatic repeat request (HARM) process number and redundancy version (RV) for the transmission of multiple F-PDSCHs on S-RAT.

In Example 44, the eNB of Examples 33-44 can optionally be configured to schedule a flexible access technology physical downlink control channel (F-PDCCH) transmission; schedule a flexible access technology physical downlink shared channel (F-PDSCH) transmission in an integer number of first 5G wireless network transmission time intervals (TTIs) after the F-PDCCH transmission; and schedule an acknowledgement/negative acknowledgement (ACK/NACK) feedback using a flexible access technology physical uplink control channel (F-PUCCH) transmission in an integer number of first 5G wireless network transmission time intervals (TTIs) after the F-PDSCH transmission.

In Example 44, the eNB of Examples 33-44 can optionally be configured to schedule a first timing gap between a flexible access technology physical downlink control channel (F-PDCCH) transmission using the first 5G wireless network partition and a flexible access technology physical uplink shared channel (F-PUSCH) transmission using the second 5G wireless network partition, the first timing gap being a first integer of first 5G wireless network TTIs. The eNB can also optionally be configured to schedule a second timing gap between the F-PUSCH transmission using the second 5G wireless network partition and an acknowledgement/negative acknowledgement (ACK/NACK) feedback using the flexible access technology physical hybrid-ARQ indicator channel (F-PHICH) or F-PDCCH, the second timing gap being a second integer of first 5G wireless network TTIs. When a NACK feedback is transmitted, the eNB can also optionally be configured to schedule a third timing gap between the F-PHICH transmission or F-PDCCH transmission and a F-PUSCH retransmission, the third timing gap equal to the first timing gap.

Additional Examples

Additional Example 1 is a system and method of wireless communication for multi-Radio Access Technology (RAT) coordination for 5G, comprising a method for UEs to access to secondary RAT; a mechanism for cross-RAT scheduling when S-RAT is scheduled by primary RAT (P-RAT); and a mechanism for cross-RAT scheduling when P-RAT is scheduled by S-RAT.

Additional Example 2 is a method of Additional Example 1, wherein UE acquires the downlink time and frequency synchronization to a P-RAT and decodes the master information block (MIB) from PBCH and system information block (SIBs). wherein UE obtains the necessary system information for access to S-RAT from P-RAT via SIB or UE dedicated RRC signaling. wherein UE detects downlink synchronization signal in S-RAT within a search window which size is either fixed in spec or configured by higher layers.

Additional Example 3 is a method of Additional Example 2, wherein the system information for access to S-RAT includes at least resource configuration in time and frequency for S-RAT; DL bandwidth; antenna configuration information; MBSFN configuration; frame structure configuration, ARFCN value to indicate the frequency of S-RAT; numerology for S-RAT, and configuration of downlink synchronization signal, i.e., physical cell identity and/or transmission offset between P-RAT and S-RAT.

Additional Example 4 is a method of Additional Example 1, wherein cross-RAT scheduling and/or cross-RAT-TTI scheduling are defined when S-RAT is scheduled by P-RAT in the downlink.

Additional Example 5 is a method of Additional Example 4, wherein for cross-RAT/cross-partition/cross-carrier or cross-RAT cross-partition/cross-carrier/cross-TTI scheduling, DCI format for downlink assignment and uplink grant includes at least S-RAT index or partition index; Carrier band index for S-RAT; TTI index in S-RAT.

Additional Example 6 is a method of Additional Example 4, wherein the starting OFDM symbols in the transmission of Flexible Access Technology (FAT)-physical downlink share channel (FPDSCH) F-PDSCH in S-RAT can be configured by higher layers, via MIB, SIB or UE specific dedicated RRC signaling.

Additional Example 7 is a method of Additional Example 4, wherein for cross-RAT scheduling, ACK/NACK feedback is transmitted on F-PUCCH on P-RAT.

Wherein the gap between F-PDSCH on S-RAT and F-PUCCH on P-RAT is L P-RAT TTI (P-TTI).

Additional Example 8 is a method of Additional Example 4, wherein the existing LTE PUCCH resource index determination rule in LTE is reused to determine F-PUCCH resource index.

Additional Example 9 is a method of Additional Example 4, wherein S-TTI index is included in the determination of the F-PUCCH resource index.

Additional Example 10 is a method of Additional Example 4, wherein S-RAT index can be included in the determination of the F-PUCCH resource index.

Additional Example 11 is a method of Additional Example 4, wherein one of fields in DCI format of the corresponding F-PDCCH can be used to dynamically determine the F-PUCCH resources value from values configured by higher layers with a predefined mapping rule.

Additional Example 12 is a method of Additional Example 4, wherein a single F-PDCCH on P-RAT can be used to schedule multiple F-PDSCH transmissions on S-RAT for single UE. Wherein S-TTI index, resource allocation, MCS, HARQ process number and redundancy version (RV) for the transmission of multiple F-PDSCHs on S-RAT is aggregated to form a single F-PDCCH. Wherein multiple ACK/NACK feedbacks can be aggregated together on single F-PUCCH transmission.

Additional Example 13 is a method of Additional Example 4, wherein for cross-RAT-TTI scheduling, F-PDCCH in P-TTI #n schedules the F-PDSCH in P-TTI #(n+K). wherein the ACK/NACK feedback is transmitted on F-PUCCH on P-RAT on P-TTI # (n+K+L).

Additional Example 14 is a method of Additional Example 1, wherein cross-RAT scheduling is defined when S-RAT is scheduled by P-RAT in the uplink.

Additional Example 15 is a method of Additional Example 14, wherein the gap between F-PDCCH scheduling on P-RAT and F-PUSCH transmission on S-RAT is $K_0$ P-TTI, Wherein the gap between F-PUSCH transmission on S-RAT and ACK/NACK feedback on F-PHICH or F-PDCCH on P-RAT is $K_1$ P-TTI. Wherein in the case for NACK, the gap between F-PUSCH retransmission and ACK/NACK feedback is $K_0$ P-TTI.

Additional Example 16 is a method of Additional Example 14, wherein the existing PHICH resource index determination rule in LTE is reused to derive the F-PHICH resource index.

Additional Example 17 is a method of Additional Example 14, wherein S-TTI index is included in the determination of the F-PHICH resource index.

Additional Example 18 is a method of Additional Example 14, wherein S-RAT index is included in the determination of the F-PHICH resource index.

Additional Example 19 is a method of Additional Example 14, wherein single F-PDCCH can be used to schedule the transmission of F-PUSCH transmissions on S-RAT for single UE.

Additional Example 20 is a method of Additional Example 1, wherein either cross-RAT and/or cross-RAT-TTI scheduling are defined in the case when P-RAT is scheduled by S-RAT in the downlink.

Additional Example 21 is a method of Additional Example 20, wherein DCI format for downlink assignment and uplink grant includes at least P-RAT index or partition index; carrier band index for P-RAT.

Additional Example 22 is a method of Additional Example 20, wherein for cross-RAT scheduling, F-PDSCH on P-RAT is scheduled by F-PDCCH on S-RAT within the same P-TTI; Wherein the gap between F-PDSCH transmission on P-RAT and ACK/NACK feedback on F-PUCCH on S-RAT is $K_0$ P-TTIs.

Additional Example 23 is a method of Additional Example 1, wherein cross-RAT is defined in the case when P-RAT is scheduled by S-RAT in the uplink.

Additional Example 24 is a method of Additional Example 23, wherein for cross-RAT scheduling, the gap between F-PDCCH scheduling on S-RAT and F-PUSCH transmission on P-RAT is $M_0$ P-TTI; wherein the gap between F-PUSCH transmission on P-RAT and ACK/NACK feedback on F-PHICH or F-PDCCH on S-RAT is $M_1$ P-TTI. Wherein in the case for NACK, the gap between F-PUSCH retransmission and ACK/NACK feedback is $M_0$ P-TTI.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

Computer systems and the computers in a computer system may be connected via a network. Suitable networks for configuration and/or use as described herein include one or more local area networks, wide area networks, metropolitan area networks, and/or Internet or IP networks, such as the World Wide Web, a private Internet, a secure Internet, a value-added network, a virtual private network, an extranet, an intranet, or even stand-alone machines which communicate with other machines by physical transport of media. In particular, a suitable network may be formed from parts or entireties of two or more other networks, including networks using disparate hardware and network communication technologies.

One suitable network includes a server and one or more clients; other suitable networks may contain other combinations of servers, clients, and/or peer-to-peer nodes, and a given computer system may function both as a client and as a server. Each network includes at least two computers or computer systems, such as the server and/or clients. A computer system may include a workstation, laptop computer, disconnectable mobile computer, server, mainframe, cluster, so-called "network computer" or "thin client," tablet, smart phone, personal digital assistant or other hand-held computing device, "smart" consumer electronics device or appliance, medical device, or a combination thereof.

Suitable networks may include communications or networking software, such as the software available from Novell®, Microsoft®, and other vendors, and may operate using TCP/IP, SPX, IPX, and other protocols over twisted pair, coaxial, or optical fiber cables, telephone lines, radio waves, satellites, microwave relays, modulated AC power lines, physical media transfer, and/or other data transmission "wires" known to those of skill in the art. The network may encompass smaller networks and/or be connectable to other networks through a gateway or similar mechanism.

Various techniques, or certain aspects or portions thereof, may take the form of program code (i.e., instructions) embodied in tangible media, such as floppy diskettes, CD-ROMs, hard drives, magnetic or optical cards, solid-state memory devices, a nontransitory computer-readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and nonvolatile memory and/or storage elements), at least one input device, and at least one output device. The volatile and nonvolatile memory and/or storage elements may be a RAM, an EPROM, a flash drive, an optical drive, a magnetic hard drive, or other medium for storing electronic data. The eNB (or other base station) and UE (or other mobile station) may also include a transceiver component, a counter component, a processing component, and/or a clock component or timer component. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or interpreted language, and combined with hardware implementations.

Each computer system includes one or more processors and/or memory; computer systems may also include various input devices and/or output devices. The processor may include a general purpose device, such as an Intel®, AMD®, or other "off-the-shelf" microprocessor. The processor may include a special purpose processing device, such as ASIC, SoC, SiP, FPGA, PAL, PLA, FPLA, PLD, or other customized or programmable device. The memory may include static RAM, dynamic RAM, flash memory, one or more flip-flops, ROM, CD-ROM, DVD, disk, tape, or magnetic, optical, or other computer storage medium. The input device(s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

It should be understood that many of the functional units described in this specification may be implemented as one or more components, which is a term used to more particularly emphasize their implementation independence. For example, a component may be implemented as a hardware circuit comprising custom very large scale integration (VLSI) circuits or gate arrays, or off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together, but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components, and may be embodied in any suitable form and organized within any suitable type of data structure. The operational data may be collected as a single data set, or may be distributed over different locations including over different storage devices, and may exist, at least partially, merely as electronic signals on a system or network. The components may be passive or active, including agents operable to perform desired functions.

Several aspects of the embodiments described will be illustrated as software modules or components. As used herein, a software module or component may include any type of computer instruction or computer-executable code located within a memory device. A software module may, for instance, include one or more physical or logical blocks of computer instructions, which may be organized as a routine, program, object, component, data structure, etc., that perform one or more tasks or implement particular data types. It is appreciated that a software module may be implemented in hardware and/or firmware instead of or in addition to software. One or more of the functional modules described herein may be separated into sub-modules and/or combined into a single or smaller number of modules.

In certain embodiments, a particular software module may include disparate instructions stored in different locations of a memory device, different memory devices, or different computers, which together implement the described functionality of the module. Indeed, a module may include a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Reference throughout this specification to "an example" means that a particular feature, structure, or characteristic described in connection with the example is included in at least one embodiment of the present invention. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of materials, frequencies, sizes, lengths, widths, shapes, etc., to provide a thorough understanding of embodiments of the invention. One skilled in the relevant art will recognize, however, that the invention may be practiced without one or more of the specific details, or with other methods, components, materials, etc. In other instances, well-known structures, materials, or operations are not shown or described in detail to avoid obscuring aspects of the invention.

It should be recognized that the systems described herein include descriptions of specific embodiments. These embodiments can be combined into single systems, partially combined into other systems, split into multiple systems or divided or combined in other ways. In addition, it is contemplated that parameters/attributes/aspects/etc. of one embodiment can be used in another embodiment. The parameters/attributes/aspects/etc. are merely described in one or more embodiments for clarity, and it is recognized that the parameters/attributes/aspects/etc. can be combined with or substituted for parameters/attributes/etc. of another embodiment unless specifically disclaimed herein.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the invention is not to be limited to the details given herein, but may be modified within the scope and equivalents of the appended claims.

Those having skill in the art will appreciate that many changes may be made to the details of the above-described embodiments without departing from the underlying principles of the invention. The scope of the present invention should, therefore, be determined only by the following claims.

The invention claimed is:

1. A user equipment (UE) comprising:
   one or more wireless transceivers configured to communicate using a first radio access technology (RAT) and a second RAT, wherein the first RAT and second RAT are serviced by one or more enhanced node Bs (eNBs);
   circuitry configured to:
      receive from one of the one or more eNBs scheduling information for the second RAT using the first RAT; and
      receive or transmit a message according to the scheduling information using the second RAT,
      wherein the first RAT is a primary RAT (P-RAT) and the second RAT is a secondary RAT (S-RAT), and the P-RAT provides scheduling information for the S-RAT, and
      wherein flexible access technology physical downlink shared channel (F-PDSCH) on the S-RAT is transmitted within the same P-RAT transmission time interval (P-TTI) when flexible access technology physical downlink control channel (F-PDCCH) is transmitted on the P-RAT.

2. The UE of claim 1, wherein the first RAT and the second RAT use a same radio access technology.

3. The UE of claim 1, wherein the first RAT and the second RAT use different radio access technologies.

4. The UE of claim 1, wherein the F-PDSCH on the S-RAT is transmitted after an integer number of the P-RAT transmission time interval (P-TTI) when the F-PDCCH is transmitted on the P-RAT.

5. The UE of claim 1, wherein the scheduling information further comprises downlink control information that includes downlink assignment and uplink grant information, the downlink assignment and uplink grant information further comprising S-RAT index, carrier band index for the S-RAT and transmission time interval (TTI) index in the S-RAT.

6. The UE of claim 1, wherein to receive or transmit a message according to the scheduling information using the second RAT further comprises to transmit the message using the second RAT and receive a response, using the first RAT, indicating whether the message was successfully received by the one or more eNBs using the second RAT.

7. The UE of claim 6, wherein indicating whether the message was successfully received by the one or more eNBs using the second RAT further comprises receiving an acknowledgement/negative acknowledgement (ACK/NACK) feedback using a first RAT flexible access technology physical uplink control channel (F-PUCCH); and
   wherein a timing gap between the F-PDSCH on the second RAT and the F-PUCCH on the first RAT is an integer number of transmission time intervals (TTIs) of the first RAT.

8. The UE of claim 1, wherein to receive or transmit a message according to the scheduling information using the second RAT further comprises to receive the message using the second RAT and transmit a response, using the first RAT, indicating whether the message was successfully received by the one or more eNBs using the second RAT.

9. The UE of claim 1, wherein to receive from one of the one or more eNBs scheduling information for the second RAT using the first RAT further comprises:
   determine downlink time and frequency synchronization to the first RAT;
   decode a master information block (MIB) and system information block (SIB) to determine access information for the second RAT; and
   detect a downlink synchronization signal within a search window of the second RAT.

10. The UE of claim 9, wherein the search window is fixed.

11. The UE of claim 10, wherein configuration for the search window is provided by the MIB, SIB or radio resource control (RRC) signaling.

12. A non-transitory computer-readable storage medium storing program code for causing one or more processors to perform a method, the method comprising:
    transmitting scheduling information using a first radio access technology (RAT) partition for a second RAT partition; and
    receiving from a user equipment (UE) or transmitting to a UE a message according to the scheduling information using the second RAT partition,
    wherein a flexible access technology physical downlink shared channel (F-PDSCH) on the second RAT partition is transmitted within the same first RAT partition transmission time interval (TTI) when flexible access technology physical downlink control channel (F-PDCCH) is transmitted on the first RAT.

13. The non-transitory computer-readable storage medium of claim 12, wherein the scheduling information further comprises resource configuration in time and frequency for the second RAT partition, downlink (DL) bandwidth, antenna configuration information, multicast-broadcast single-frequency network (MBSFN) configuration, frame structure configuration, absolute radio-frequency channel number (ARFCN) value, numerology for the second RAT partition, or configuration of a downlink synchronization signal.

14. The non-transitory computer-readable storage medium of claim 12, wherein to transmit scheduling information using a first radio access technology (RAT) partition further comprises configuring, via master information block (MIB), system information block (SIB) or radio resource control (RRC) signaling, starting orthogonal frequency-division multiplexing (OFDM) symbols in the transmission of the F-PDSCH using the second RAT partition.

15. The non-transitory computer-readable storage medium of claim 12, wherein to transmit the scheduling information using the first RAT partition for the second RAT partition further comprises using a F-PDCCH transmission to schedule multiple F-PDSCH transmissions on the second RAT for the UE.

16. The non-transitory computer-readable storage medium of claim 15, wherein to schedule the multiple F-PDSCH transmissions further comprises aggregating a secondary RAT (S-RAT) transmission time interval (S-TTI) index, resource allocation, modulation and coding scheme (MCS), hybrid automatic repeat request (HARM) process number and redundancy version (RV) for the multiple F-PDSCH transmissions on the S-RAT.

17. The non-transitory computer-readable storage medium of claim 12, wherein to transmit the scheduling information using the first RAT partition further comprises:

scheduling a F-PDCCH transmission;

scheduling a F-PDSCH transmission in an integer number of first RAT transmission time intervals (TTIs) after the F-PDCCH transmission; and scheduling an acknowledgement/negative acknowledgement (ACK/NACK) feedback using a flexible access technology physical uplink control channel (F-PUCCH) transmission in an integer number of first RAT transmission time intervals (TTIs) after the F-PDSCH transmission.

18. The non-transitory computer-readable storage medium of claim 12, wherein to transmit the scheduling information further comprises:

scheduling a first timing gap between a F-PDCCH transmission using the first RAT partition and a flexible access technology physical uplink shared channel (F-PUSCH) transmission using the second RAT partition, the first timing gap being a first integer of first RAT transmission time intervals (TTIs);

scheduling a second timing gap between the F-PUSCH transmission using the second RAT partition and an acknowledgement/negative acknowledgement (ACK/NACK) feedback using the flexible access technology physical hybrid-ARQ indicator channel (F-PHICH) or F-PDCCH, the second timing gap being a second integer of first RAT TTIs; and when a NACK feedback is transmitted, scheduling a third timing gap between the F-PHICH transmission or F-PDCCH transmission and a F-PUSCH retransmission, the third timing gap equal to the first timing gap.

* * * * *